(12) United States Patent
Steensgaard-Madsen et al.

(10) Patent No.: US 9,472,304 B2
(45) Date of Patent: Oct. 18, 2016

(54) CONFIGURING SIGNAL-PROCESSING SYSTEMS

(71) Applicant: LINEAR TECHNOLOGY CORPORATION, Milpitas, CA (US)

(72) Inventors: Jesper Steensgaard-Madsen, San Jose, CA (US); Manideep Gande, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 14/712,539

(22) Filed: May 14, 2015

(65) Prior Publication Data

US 2015/0332785 A1 Nov. 19, 2015

Related U.S. Application Data

(60) Provisional application No. 61/994,537, filed on May 16, 2014.

(51) Int. Cl.
*H03M 1/12* (2006.01)
*G11C 27/02* (2006.01)
*G06F 17/50* (2006.01)

(52) U.S. Cl.
CPC ......... *G11C 27/024* (2013.01); *G06F 17/5031* (2013.01); *H03M 1/12* (2013.01); *H03M 1/1255* (2013.01)

(58) Field of Classification Search
CPC ........... G11C 27/024; G06F 17/5031; H03M 1/1255; H03M 1/12
USPC ................................................ 341/155, 141
See application file for complete search history.

(56) References Cited

U.S. PATENT DOCUMENTS

| | | | |
|---|---|---|---|
| 6,271,782 B1 | 8/2001 | Steensgaard-Madsen | |
| 7,561,091 B1 * | 7/2009 | Muenter | H03M 1/007 341/122 |
| 8,232,905 B2 * | 7/2012 | Steensgaard-Madsen | H03M 1/162 341/155 |
| 8,576,104 B2 | 11/2013 | Steensgaard-Madsen et al. | |
| 8,766,939 B2 * | 7/2014 | Sobel | G06F 3/0416 178/18.06 |
| 8,810,443 B2 | 8/2014 | Steensgaard-Madsen | |
| 8,922,411 B2 * | 12/2014 | Ullmann | H03M 3/392 341/120 |
| 8,963,763 B2 * | 2/2015 | Kull | H03M 1/0682 341/118 |
| 9,312,876 B1 * | 4/2016 | Field | H03M 1/42 |
| 9,350,374 B2 * | 5/2016 | Sundblad | H03M 1/004 |

OTHER PUBLICATIONS

Hogenauer, E.B. 1981. An Economical Class of Digital Filters for Decimation and Interpolation. IEEE Transactions on Acoustics, Speech, and Signal Processing, vol. ASSP-29, No. 2, Apr. 1981, pp. 155-162.
Linear Technology Corporation. 2013. 20-Bit, 1Msps, Low Power SAR ADC with 0.55ppm INL. Technical Data Sheet LTC2378-20, copyright 2013, by Linear Technology Corporation, Milpitas, CA.

* cited by examiner

*Primary Examiner* — Brian Young
(74) *Attorney, Agent, or Firm* — McDermott Will & Emery LLP

(57) ABSTRACT

A configurable signal-processing circuit may provide a plurality of selectable signal-processing operations. The configurable signal-processing circuit may have a configuration circuit that provides a configuration code that selects a first signal-processing operation from the plurality of selectable signal-processing operations based on a timing pattern for evaluating an input signal and outputting an output signal.

46 Claims, 13 Drawing Sheets

| Configuration Code (CC) | Filter Type | Sample-Rate Ratio |
|---|---|---|
| 00_00 | First-Order CIC | 4:1 |
| 00_01 | First-Order CIC | 16:1 |
| 00_10 | First-Order CIC | 1:4 |
| 00_11 | First-Order CIC | 1:16 |
| 01_00 | Second-Order CIC | 4:1 |
| 01_01 | Second-Order CIC | 16:1 |
| 01_10 | Second-Order CIC | 1:4 |
| 01_11 | Second-Order CIC | 1:16 |
| 10_00 | Third-Order CIC | 4:1 |
| 10_01 | Third-Order CIC | 16:1 |
| 10_10 | Third-Order CIC | 1:4 |
| 10_11 | Third-Order CIC | 1:16 |
| 11_00 | Fourth-Order CIC | 4:1 |
| 11_01 | Fourth-Order CIC | 16:1 |
| 11_10 | Fourth-Order CIC | 1:4 |
| 11_11 | Fourth-Order CIC | 1:16 |

FIGURE 2

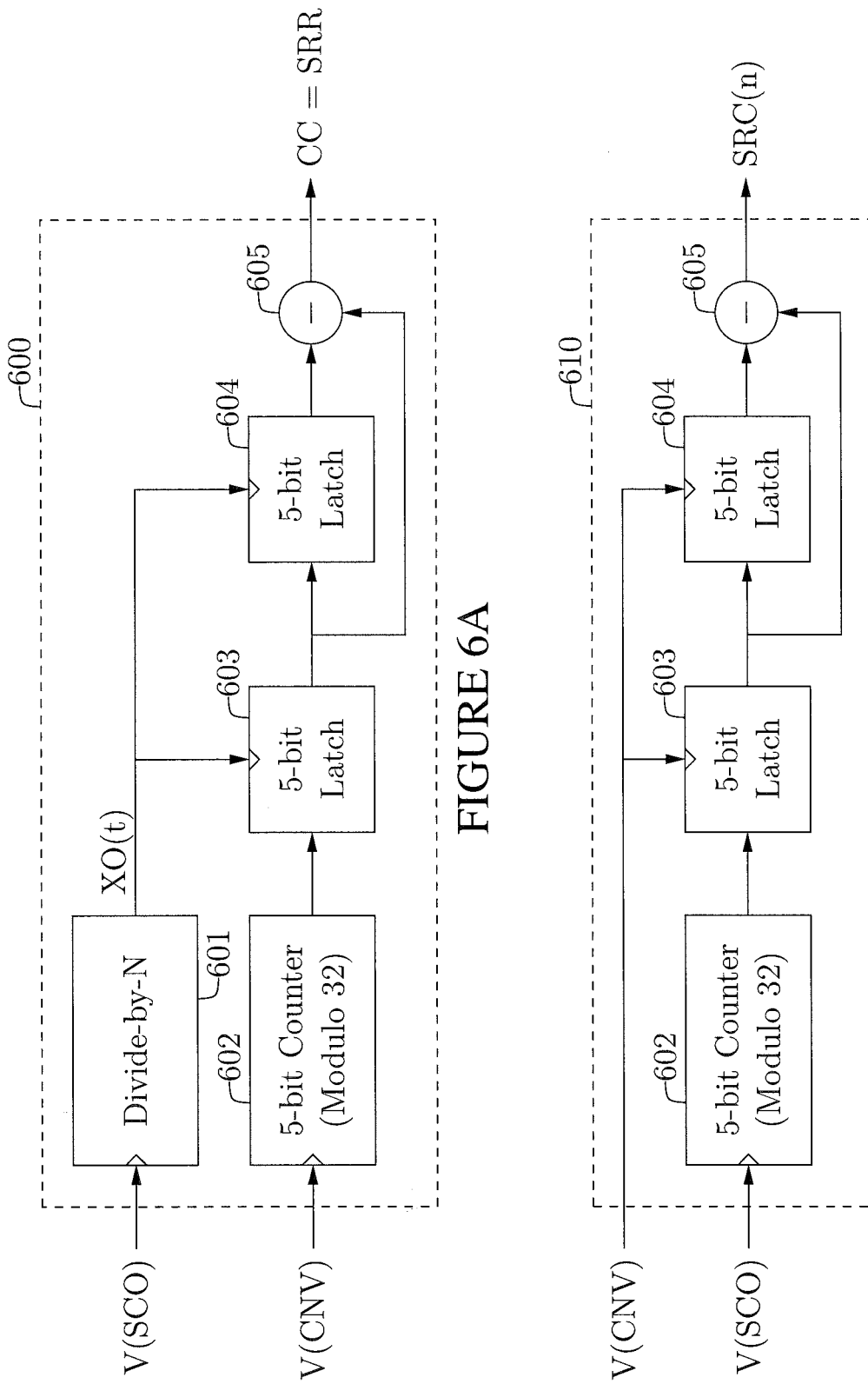

CONFIGURING SIGNAL-PROCESSING SYSTEMS

CROSS-REFERENCE TO RELATED APPLICATION

This application is based upon and claims priority to U.S. provisional patent application 61/994,537, entitled "Configuring Multi-rate Systems," filed May 16, 2014, The entire content of this application is incorporated herein by reference.

BACKGROUND

1. Technical Field

This disclosure relates to electrical circuits, including signal-processing circuits and systems.

2. Related Art

Signal-processing circuits and systems may be used in a wide range of applications, including, but not limited to, audio, automotive, data acquisition, industrial control, medical diagnostics and treatment, navigation, radar detection, seismology, and sensors.

A signal-processing operation of a configurable signal-processing circuit may be selected to be one of several predefined selectable signal-processing operations.

FIG. 1A shows a prior-art configurable signal-processing circuit/system 100. An input signal may be an input sequence of values I(n) received at a first sample rate. An exemplary first sample rate may be 1 million values (samples) received per second, corresponding to a period of the first sample rate of 1 micro-second (one millionth of a second). An output signal may be an output sequence of values O(k) provided at a second sample rate. An exemplary second sample rate may be 250 thousand values outputted per second, corresponding to a period of the second sample rate of 4 micro-seconds. For some selectable configurations of configurable signal-processing circuit 100, a first sample rate of input I(n) may be equal to a second sample rate of output O(k). For other selectable configurations of the circuit 100, the first and second sample rates may be distinct. A ratio of an input (first) sample rate divided by an output (second) sample rate may be referred to as a sample-rate ratio (SRR). An exemplary sample-rate ratio may be characterized as 1,000,000/250,000, 4:1, or 4.

Individual values comprised in an input sequence I(n) may be indexed (pointed to) by individual values of a first sequence index n. For example, a first value in an exemplary sequence I(n)=3, 6, 22, 8, 6, . . . , is I(1)=3, a second value therein is I(2)=6, a third value therein is I(3)=22, and so forth. Likewise, individual values comprised in an output sequence O(k) may be indexed by individual values of a second sequence index k. First sequence index n increments at the first sample rate of I(n). Second sequence index k increments at the second sample rate of O(k).

FIG. 1B shows an exemplary timing diagram for an input sequence I(n), output sequence O(k), and sample-rate ratio of 4:1. A first (input) timing waveform WI(t) may be provided to indicate instances in time (e.g., at low-to-high transitions) when individual values of input sequence I(n) are steady (ready) and may be evaluated (read) reliably by configurable signal-processing circuit 100 (FIG. 1A). Circuit 100 may provide a second (output) timing waveform WO(t) for indicating instances in time when individual values of output sequence O(k) are steady (ready) and may be evaluated (read) reliably by an external circuit (not shown) receiving O(k).

First and second timing waveforms, WI(t) and WO(t), may be optional and may be not received and/or provided by some configurable signal-processing circuits. For example, an external circuit (not shown) may provide I(n), WI(t), and a configuration code CC to a configurable signal-processing circuit 100 (FIG. 1A), and it may receive only sequence O(k) back from circuit 100. A specification document (data sheet) for circuit 100 may provide values for timing parameters that may enable the external circuit to reliably read each value of the output sequence O(k) without relying upon (or having access to) WO(t).

Configurable signal-processing circuit 100 (FIG. 1A) receives a configuration code CC that selects one of several selectable predefined signal-processing operations. For example, a first segment of the configuration code may select a type of filter for a filtering operation. A second segment of the configuration code may select a sample-rate ratio.

FIG. 2 shows a configuration table for an exemplary configurable signal-processing circuit. A four-bit configuration code CC selects one of 16 selectable combinations of a filter type and a sample-rate ratio. Sample-rate ratios that are greater than one (e.g., 4:1 and 16:1) may be selected to configure the exemplary circuit to operate as a decimation filter. Sample-rate ratios that are smaller than one (e.g., 1:4 and 1:16) may be selected to configure the exemplary circuit to operate as an interpolation filter. Decimation and interpolation filter circuits may be implemented as described by Eugene B. Hogenauer in a paper titled "An Economical Class of Digital Filters for Decimation and Interpolation," which was published in the April 1981 issue of *IEEE Transactions on Acoustics, Speech, and Signal Processing*". This paper by Hogenauer is incorporated herein by reference for describing theory, operation, and practical implementation of decimation and interpolation filters, including (but not limited to) such circuits based on Cascaded-Integrator-Comb (CIC) filters of any order. CIC filters may be a hardware-efficient implementation of a filter type commonly known as SINC filters. Decimation filters, interpolation filters, and many other types of signal-processing operations and circuits are described in literature including professional journals, text books, and patents.

Persons skilled in the art will recognize that a regular structure of CIC filters facilitates configuring and re-configuring circuitry to provide a plurality of selectable signal-processing operations. For example, circuitry configured to operate as a fourth-order CIC filter may be re-configured to operate as a CIC filter of first-, second-, or third-order. FIG. 6 in the paper by Hogenauer shows that a multiplexer circuit may be provided to configure a fourth-order CIC filter to operate with a selectable sample-rate ratio. Re-configuration and re-use of circuitry for a configurable signal-processing circuit may be advantageous, but it is not necessary. For example, distinct dedicated circuitry may be provided for each selectable predefined signal-processing operation. Multiplexer circuits may be responsive to a configuration code to configure a signal path from an input to an output via dedicated circuitry providing a selected signal-processing operation.

Configurable signal-processing circuit 100 of FIG. 1A may provide a plurality of selectable signal-processing operations of substantially any type. Some selectable signal-processing operations may be of a substantially non-linear nature (not just time-variant). For example, a value of an output sequence O(k) may be a root-mean-square (rms) value of a plurality of values comprised in an input sequence I(n). Another selectable signal-processing operation may provide a transformation-type operation. For example, values of output sequence O(k) may be derived by Fourier Transformations applied to segments of input sequence I(n), and O(k) may be a frequency-domain representation of a signal. Such segments of I(n) may be overlapping, back-to-back, or sparse, corresponding to a sample-rate ratio that may be either greater than, equal to, or smaller than one. Other selectable signal-processing operations may provide a filtering operation with a selectable frequency response for one or more selectable sample-rate ratios. An exemplary signal-processing circuit may be configurable to selectively operate as a decimation filter, as an interpolation filter, or as a conventional filter with a sample-rate ratio of one. Several options for an overall frequency response from I(n) to O(k) may be selectable for some or all selectable sample-rate ratios. Accordingly, a configurable signal-processing circuit 100 (FIG. 1A) may provide a wide range of predefined selectable signal-processing operations.

Providing a configuration code CC to a configurable signal-processing circuit 100 (FIG. 1A) may be a relatively trivial matter if the circuit 100 is comprised within a fully-integrated system on a chip (such as a single-die integrated-circuit chip). For example, providing a configuration code CC of FIG. 2 to circuit 100 of FIG. 1A from another circuit block within a fully-integrated system on a chip may require relatively few wires and/or other types of internal connections, which may represent a negligible cost (i.e., a modest allocation of an abundant resource). The situation may be quite different when circuit 100 is physically separated from a circuit providing a configuration code. For example, if circuit 100 is implemented as an integrated-circuit chip enclosed in a separate package mounted on a printed circuit board, then receiving a configuration code from a circuit that is external to the package may involve a considerable allocation of a substantially limited resource. Specifically, one or more pins of the package may be dedicated to receiving the configuration code. The point here is not that it necessarily is technically challenging to provide or receive a configuration code, but rather that it may be undesirable to allocate a substantially limited resource for that purpose.

It is often desirable to shrink a physical size of a device incorporating signal processing, for example a medical device. Integrated-circuit chips may be enclosed in progressively smaller and smaller packages, which may have fewer and fewer pins available for making connections to an enclosed integrated-circuit chip. It may be undesirable to dedicate 4 pins of an integrated-circuit package for receiving an exemplary 4-bit configuration code, especially if a total number of pins for the package is relatively small, say 8, 10, or 12. It is well-known that a configuration code may be received via a digital serial interface, and that may be done to limit a number of pins dedicated to receiving a multi-bit configuration code to only one. However, it may be undesirable to dedicate even a single pin for this purpose. Furthermore, it may cause an external circuit to be constrained by another substantially limited resource. For example, an external circuit may not have a (spare) port available for digital serial communication of a configuration code.

What is needed is circuits and methods for configuring a configurable signal-processing circuit without dedicating any connections (e.g., pins of a package or other ports) exclusively for selecting a predefined signal-processing operation.

What is needed is a substantially self-configuring signal-processing circuit.

SUMMARY

A configurable signal-processing circuit may provide a plurality of selectable signal-processing operations. The configurable signal-processing circuit may have a configuration circuit that provides a configuration code that selects a first signal-processing operation from the plurality of selectable signal-processing operations based on a timing pattern for evaluating an input signal and outputting an output signal.

An analog-to-digital converter circuit may evaluate an analog input signal and output an output sequence of encoded numerical values via a serial interface. The analog-to-digital converter circuit may include a configurable signal-processing core circuit that receives an input sequence of encoded numerical values derived from the analog input signal and derives the output sequence of encoded numerical values. A signal-processing operation provided by the configurable signal-processing core circuit may be selectable by requesting symbols to be outputted via the serial interface in accordance with a predefined timing pattern.

A signal-processing circuit may receive a sequence of input values and output a first value in a sequence of output values in response to receiving a request for the first output value. The signal-processing circuit may include a state-machine circuit that transitions to a predefined state or a state that is equivalent to the predefined state in response to the signal-processing circuit receiving the request for the first output value. A second value in the sequence of output values may be responsive to a state of the state-machine circuit.

A signal-processing circuit may receive an input signal and output an output signal. The signal-processing circuit may include a configuration circuit that provides a configuration code based on a timing pattern for evaluating the input signal and outputting the output signal. The signal-processing circuit may have a configurable property responsive to the configuration code.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 2 (Prior Art) illustrates an exemplary configuration table for a signal-processing circuit, which may be selectively configured to operate either as a decimation filter or as an interpolation filter.

FIG. 6A shows an exemplary configuration circuit for deriving a configuration code CC=SRR.

FIG. 6B shows an exemplary symbol-request-counting circuit for counting a number of bits (symbols) requested during time intervals.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

An exemplary embodiment may be coupled to an external circuit via relatively few external connections. An external connection may be provided via a terminal. Examples of terminals include, but are not limited to, pins of an integrated-circuit package, pads on a chip, bond-wires, stacked-die connections, photo diodes, and antennas or coils for electro-magnetic coupling.

One or more digital serial interface circuits may be provided to limit a number of terminals dedicated to inputting or outputting a sequence of encoded numerical values (a digital sequence, or a digital signal). Each numerical value in a digital sequence may be encoded as an ordered plurality of symbols using a predefined encoding method. For example, any integer value in a range from negative 32,768 to positive 32,767 may be encoded as a vector (an ordered plurality) of 16 binary symbols (often referred to as "bits") using a 2s-complement encoding method that is well-known to persons skilled in the art. A state of a bit (a binary symbol value) may be referred to as either 0 or 1. An exemplary digital serial interface circuit may be configured to communicate symbol values as predefined distinguishable voltage levels (e.g., 0V and 2V) applied to a terminal with respect to a reference node (e.g., ground). Other exemplary digital serial interface circuits may use distinguishable current levels, distinguishable levels of flux or field, distinguishable frequencies, distinguishable phase information, or other distinguishable messages, to represent and communicate symbol values. Binary codes (vectors of binary symbols) may be used for many embodiments. For other embodiments, numerical values may be encoded as vectors of symbols having more than two possible values. A well-known base-ten positional number system represents numerical values using symbols having ten possible values: 0, 1, 2, 3, 4, 5, 6, 7, 8, and 9. A digital serial interface circuit may communicate symbols having any number of possible values. Binary symbols and codes will be used to describe several exemplary embodiments.

Figure 3A:
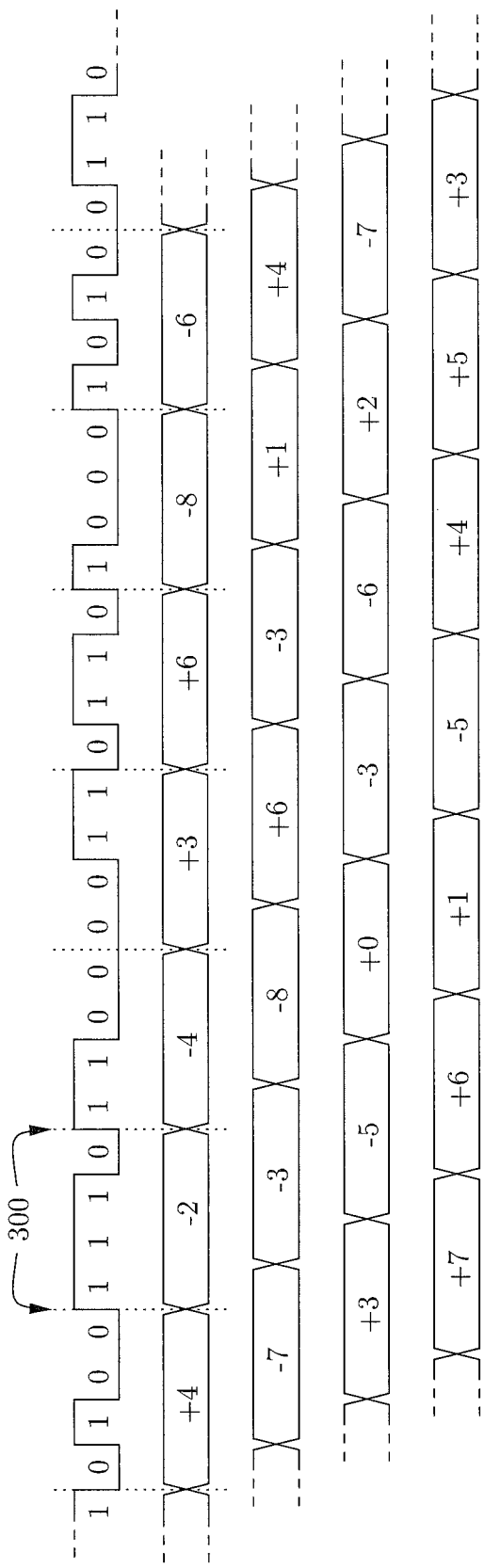
FIG. 3A shows an exemplary received stream of bits that is known to result from encoding a sequence of numerical values using 4-bit 2s-complement binary codes.

A method for encoding a sequence of numerical values as a sequence of bit values may include providing a separation marker (a "comma") between binary codes representing numerical values. Without some type of separation marker, it may be difficult or impossible to identify which bits in a received stream of bits that are to be combined into vectors representing individual numerical values. FIG. 3A shows an exemplary received stream of bits that is known to result from encoding a sequence of numerical values using 4-bit 2s-complement binary codes. Boundaries 300 between separate 4-bit code segments may not be known. Without knowing boundaries 300, it may be difficult or impossible to identify which one of four potential digital sequences that was encoded to produce the received stream of bits.

Figure 3B:
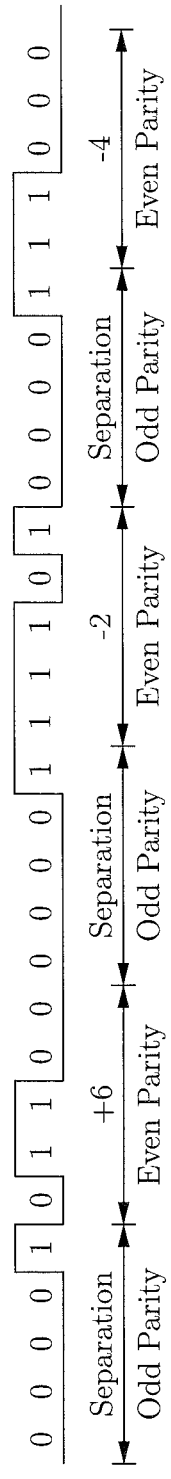
FIG. 3B shows an exemplary stream of bits including exemplary separation markers inserted between even-parity codes representing numerical values.

Separation markers may be embedded in a stream of bits representing a digital sequence. An exemplary separation marker may be a predefined sequence of bits that is not a valid code for any numerical value in a coding system. For example, a separation marker may be '00001' when an even-parity bit is appended at the end of 4-bit 2s-complement binary codes. FIG. 3B shows an exemplary stream of bits including such separation markers inserted between even-parity codes representing numerical values. Encoding techniques specified for standardized digital serial communication links, such as encoding techniques specified for an exemplary standard JESD204B, may provide other methods for separating code segments to ensure non-ambiguous serial communication of a digital sequence. Some digital serial interface circuits may provide or receive a timing waveform indicating boundaries of codes in a stream of bits. For example, a digital serial interface circuit may be responsive to a chip-select timing waveform received via a dedicated terminal to identify boundaries of codes.

Figure 4A:
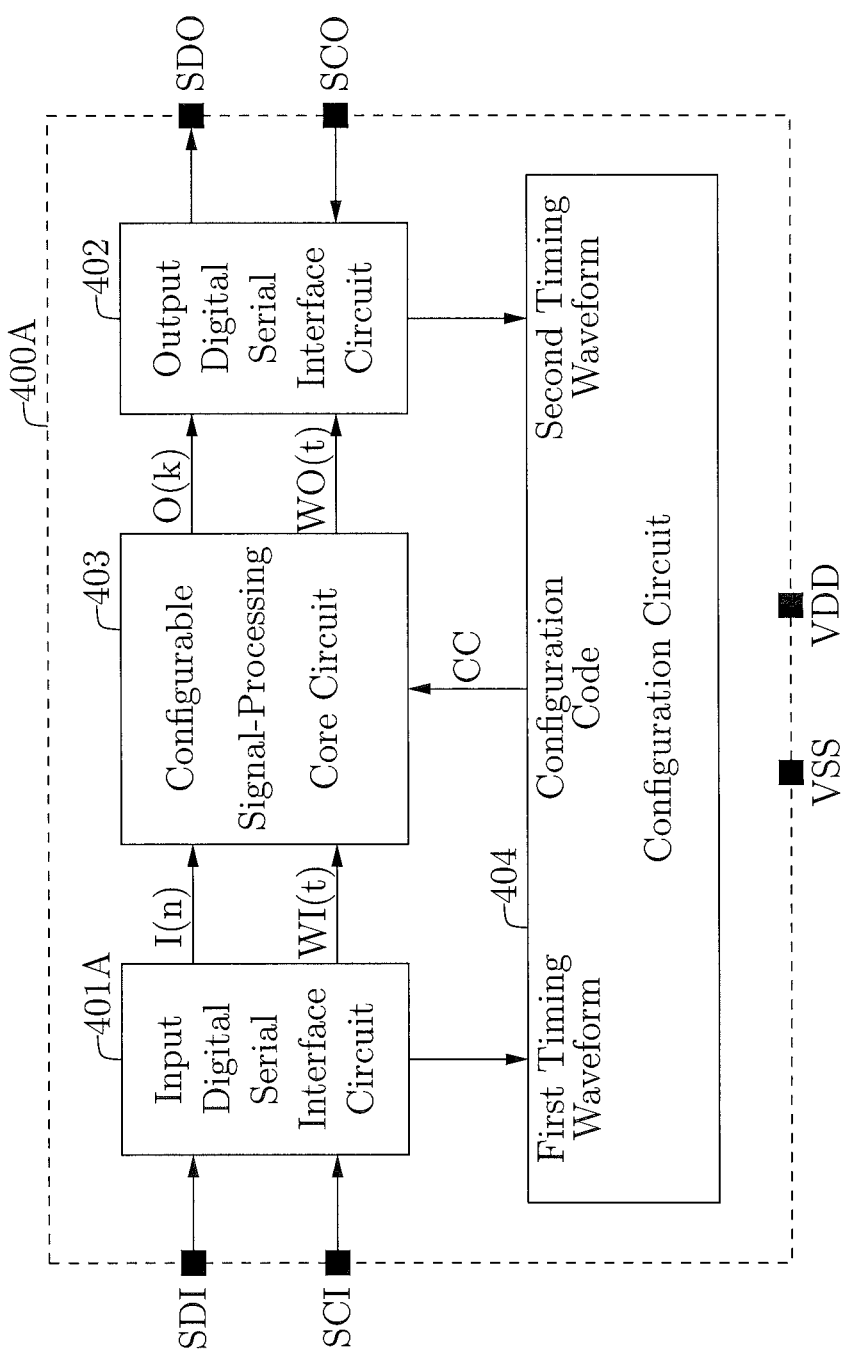
FIG. 4A shows an exemplary embodiment of a configurable signal-processing circuit.

FIG. 4A shows an exemplary embodiment of a configurable signal-processing circuit 400A. The configurable signal-processing circuit 400A may include an input digital serial interface circuit 401A, an output digital serial interface circuit 402, a configurable signal-processing core circuit 403, and a configuration circuit 404. Configuration circuit 404 may provide a configuration code CC to signal-processing core circuit 403 that selects one of several predefined signal-processing operations. Configuration code CC may be based on (derived from) a timing pattern for communication via digital serial interface circuits 401A and 402. Configuration circuit 404 will be described in more detail later.

Figure 1A:
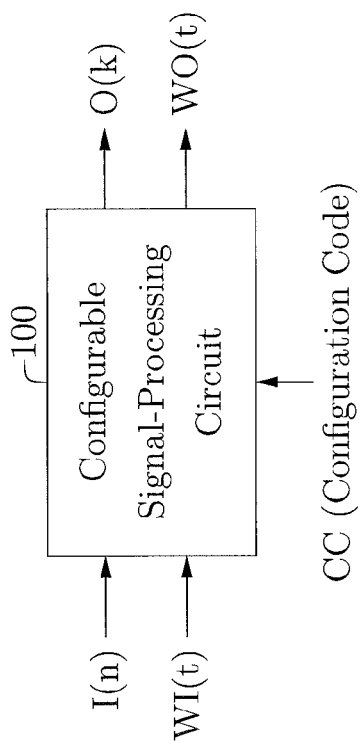
FIG. 1A (Prior Art) illustrates an exemplary configurable signal-processing circuit that receives a configuration code that selects one of several predefined signal-processing operations.

Any configurable signal-processing circuit may be provided as configurable signal-processing core circuit 403, e.g. any prior-art circuit 100 of FIG. 1A. Digital serial interface circuits 401A and 402 may be configured according to any digital serial interface protocol, e.g. a well-known serial peripheral interface (SPI) protocol. Terminals SDI, SCI, and SCO are input terminals, and terminal SDO is an output terminal for circuit 400A. Terminals VSS and VDD are power-supply terminals, e.g., V(VSS)=0V and V(VDD)=2V. Configurable signal-processing circuit 400A may operate with only 6 connections to external circuits (6 terminals), and it may be enclosed in a small 6-pin package.

Figure 1B:
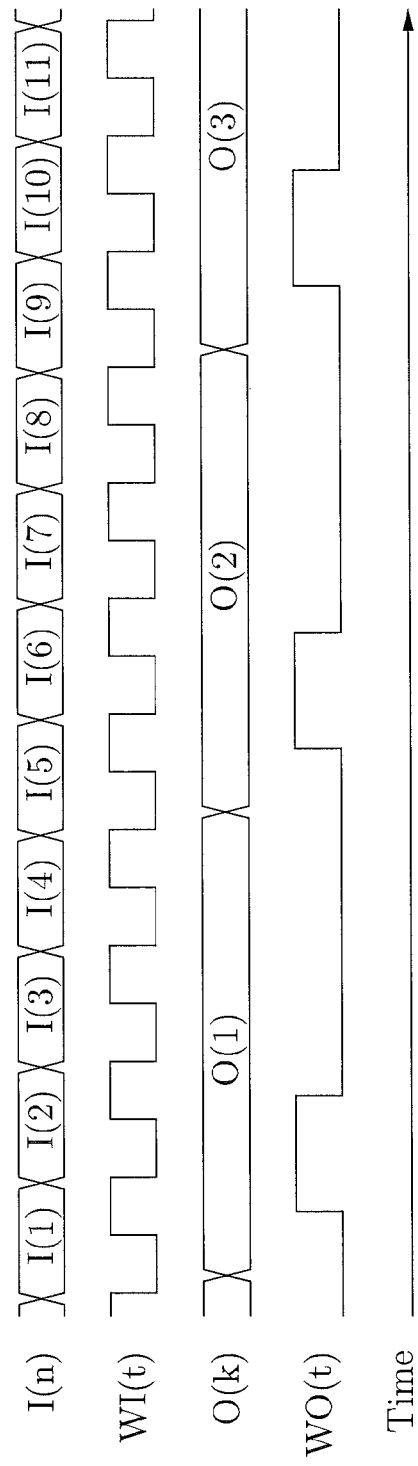
FIG. 1B (Prior Art) illustrates an exemplary timing diagram for the exemplary circuit of FIG. 1A.

A digital input sequence I(n) may be received via input digital serial interface circuit 401A. An external circuit (not shown) may apply voltage waveforms V(SDI) and V(SCI) to input terminals SDI and SCI. Voltage levels applied to terminal SDI (serial data input) may be evaluated (compared to nominal symbol values, e.g. voltage levels) by input interface circuit 401A at instances in time indicated by a timing waveform V(SCI) applied to terminal SCI (serial clock input). Accordingly, input interface circuit 401A may receive a stream of bits (binary symbol values) representing a sequence of numerical values I(n). Separation markers may be embedded in the stream of bits, or another timing waveform may be received via another terminal (not shown) to identify boundaries of codes representing numerical values I(n). Input digital serial interface circuit 401A may provide a parallel (or another format) representation of input sequence I(n) and a corresponding timing waveform WI(t) to configurable signal-processing core circuit 403 (see FIG. 1B).

Substantially any type of input digital serial interface circuit 401A may be provided for configurable signal-processing circuit 400A of FIG. 4A. The interface circuit 401A and/or applied waveforms V(SDI) and V(SCI) may have any desired specific properties. Input digital serial interface circuit 401A is an example of a circuit providing an input sequence I(n) and a timing waveform WI(t) to a configurable signal-processing core circuit 403 within a circuit 400A having relatively few terminals (SDI, SCI, SDO, SCO, VSS, VDD). Input interface circuit 401A may be substituted by any other circuit providing an input sequence I(n) and a corresponding timing waveform, such as an analog-to-digital converter circuit. Another embodiment may receive a digital input sequence I(n) and a timing waveform WI(t) directly via a number of terminals needed for parallel-type communication.

Figure 4B:
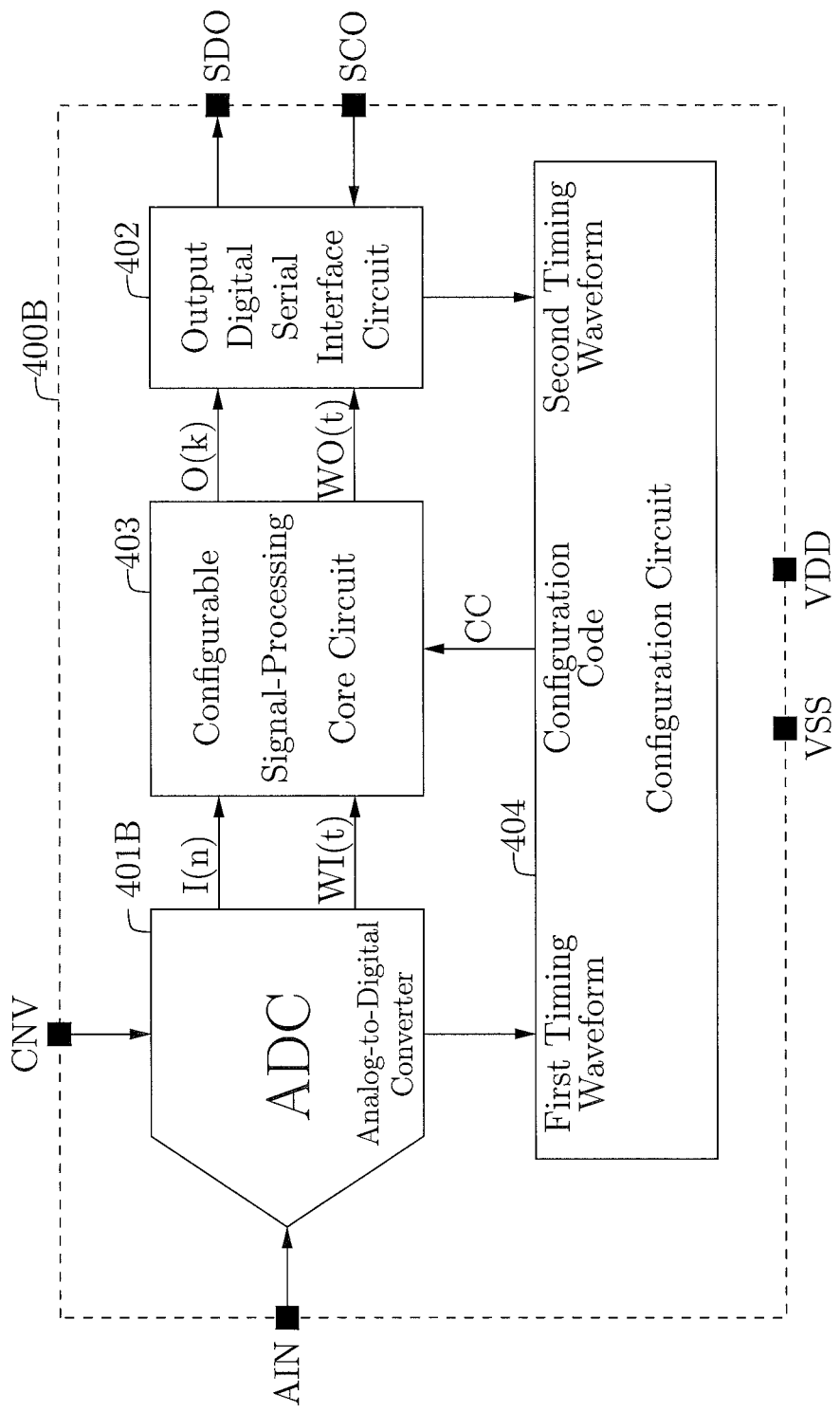
FIG. 4B shows an exemplary embodiment of a configurable signal-processing circuit that is a modification of the exemplary circuit of FIG. 4A.

FIG. 4B shows an exemplary configurable signal-processing circuit 400B that is a modification of configurable signal-processing circuit 400A of FIG. 4A. Input digital serial interface circuit 401A of FIG. 4A is substituted by an analog-to-digital converter (ADC) circuit 401B in FIG. 4B. Many types of ADC circuits are known to persons skilled in the art. ADC circuits are described in literature including professional journals, text books, and patents. U.S. Pat. Nos. 6,271,782, 8,232,905, 8,576,104, and 8,810,443 are incorporated herein by reference for describing exemplary circuits and methods for analog-to-digital conversion.

In FIG. 4B, an analog input voltage difference V(AIN, VSS) may be applied between an input terminal AIN and terminal VSS biased at 0V (ground). A timing waveform V(CNV)=V(CNV,VSS) may be applied to another input terminal CNV for controlling ADC 401B to evaluate input voltage V(AIN,VSS) to derive numerical values comprised in input sequence I(n). A numerical value I(n) nominally may characterize a ratio of an applied input voltage V(AIN, VSS) at a sampling instant divided by a reference voltage VREF. Reference voltage VREF may be applied via power-supply terminals VDD and VSS, i.e. VREF=V(VDD,VSS).

A high-performance ADC circuit may provide additional terminals not shown in FIG. 4B. For example, a high-performance ADC circuit may be configured to receive an input voltage difference V(AINP,AINM) applied via two dedicated input terminals AINP and AINM. Furthermore, a high-performance ADC circuit may receive a reference voltage VREF provided via one or more dedicated terminals, e.g., VREF=V(REFP,VSS) or VREF=V(REFP,REFM). U.S. Pat. No. 8,810,443 describes exemplary ADC circuits that sample an input voltage in response to a timing waveform, such as V(CNV). U.S. Pat. No. 6,271,782 describes exemplary continuous-time delta-sigma ADC circuits that do not sample an input voltage directly. Accordingly, ADC circuit 401B may be configured to evaluate (including, but not limited to, sample) an applied analog input voltage V(AIN, VSS) in response to an applied timing waveform V(CNV) to derive a digital input sequence I(n) comprising values that are transferred to circuit 403 at time instances indicated by a timing waveform WI(t). A numerical value of I(n) may be transferred to circuit 403 with a latency relative to when a request for evaluating V(AIN,VSS) is provided by V(CNV). For some embodiments, the latency may be a conversion time for ADC circuit 401B, which may be characterized by a minimum and/or a maximum value thereof. For some embodiments, an effective latency of ADC 401B may be substantially an integer number of periods of timing waveform V(CNV). Timing waveform WI(t) may be derived from V(CNV), e.g. by buffering or by delaying V(CNV), or by providing a one-shot circuit responsive to V(CNV).

Figure 5:
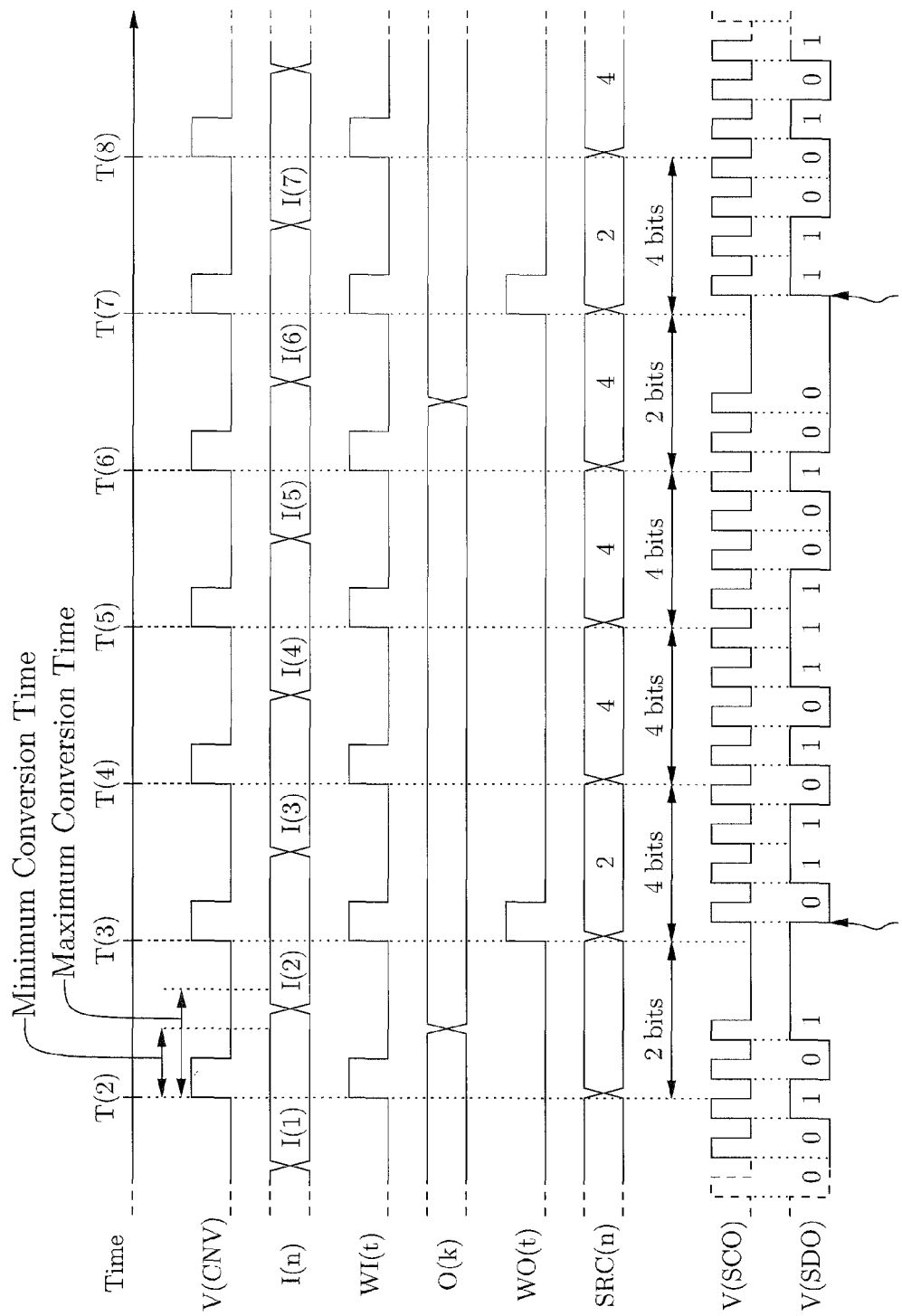
FIG. 5 shows an exemplary timing diagram for the exemplary circuit of FIG. 4B.

FIG. 5 shows an exemplary timing diagram for the exemplary circuit 400B of FIG. 4B. A rising edge of an applied timing waveform V(CNV) controls ADC 401B to evaluate an applied input voltage V(AIN,VSS) at a time instant T(2). ADC 401B provides a resulting numerical value I(2), which is transferred to circuit 403 at a rising edge of timing waveform WI(t) at a time instant T(3). In this example, an effective latency of ADC 401B is T(3)–T(2), and timing waveform WI(t) is nominally identical to the applied timing waveform V(CNV). ADC 401B provides numerical values for input sequence I(n) at a first sample rate Fs=1/Ts, where T(n)=n·Ts.

Configurable signal-processing core circuit 403 may be configured to operate with a selectable sample-rate ratio of SRR=4:1. Digital output sequence O(k) is updated at a corresponding second sample rate Fs/SRR=Fs/4. A value of digital output sequence O(k) is transferred to output digital serial interface circuit 402 at each rising edge of a timing waveform WO(t). Timing waveform WO(t) may be derived from timing waveform WI(t), for example by selectively including or skipping low-high-low pulses of WI(t). Each numerical value comprised in digital output sequence O(k) is represented by a 14-bit 2s-complement binary code that is output by interface circuit 402 as a voltage waveform V(SDO) applied to the serial interface (terminal SDO) responsive to 14 consecutive requests for bits received via terminal SCO. An external circuit (not shown) applies a timing waveform V(SCO) to terminal SCO (serial clock output) for providing the 14 consecutive requests (rising edges) to interface circuit 402 for outputting 14 bits consecutively (serially).

Configuration circuit 404 receives timing waveforms V(CNV) and V(SCO), and it provides a configuration code CC based on a timing pattern thereof. Exemplary timing waveforms V(CNV) and V(SCO) shown in FIG. 5 match a predefined first timing pattern for selecting a first value of configuration code CC. The first value of configuration code CC selects a first predefined signal-processing operation of circuit 403 for which a sample-rate ratio is SRR=4:1. Accordingly, a predefined signal-processing operation of a configurable signal-processing circuit 400B may be selected by applying timing waveforms V(CNV) and V(SCO) in a timing pattern that matches a predefined timing pattern for evaluating an input signal and outputting an output signal.

Timing waveforms V(CNV) and V(SCO) may be under control of an external circuit (not shown). The external circuit may select a predefined signal-processing operation of circuit 400B by applying timing waveforms V(CNV) and V(SCO) that match a predefined timing pattern. Switching from a first to a second predefined timing pattern causes circuit 400B to switch from a first to a second predefined signal-processing operation. Circuit 400B may be said to be self-configuring in the sense that a configuration thereof may be selected by timing properties for communication of I(n) and O(k). An advantage of a self-configuring circuit 400B may be that it automatically resumes proper operation if it somehow were to enter an erroneous mode of operation (which may be caused by a power-supply glitch, radiation, or otherwise). The prior-art configurable signal-processing circuit 100 of FIG. 1 may become stuck in an erroneous mode of operation until a correct configuration code CC is restored via a dedicated serial interface.

Several exemplary configuration circuits for deriving a configuration code CC in response to timing patterns for communicating input and output values/signals will be described next.

In an exemplary embodiment according to FIG. 4B, the configuration circuit 404 derives a configuration code CC representing a sample-rate ratio SRR by counting a number of rising edges of timing waveform V(CNV) for a sample period of output sequence O(k). The sample (sample-to-sample) period of O(k) is characterized by a spacing in time of a predefined number of rising edges of applied timing waveform V(SCO). For example, with reference to FIG. 5, a number SRR=4 of rising edges of timing waveform V(CNV) may be counted for any period of time starting at a first rising edge of timing waveform V(SCO) and ending at a fifteenth rising edge of V(SCO) and including 13 other rising edges of V(SCO). FIG. 6A shows an exemplary configuration circuit 600 for deriving a configuration code CC=SRR in this manner. Exemplary circuit 600 of FIG. 6A is a substitute for circuit 404 in FIG. 4B.

An exemplary divide-by-N circuit 601 provides a timing waveform XO(t) having one low-high-low pulse for every N (a predefined number of) low-high-low pulses of timing waveform V(SCO) that it receives as an input. Rising and falling edges of XO(t) are substantially aligned with rising edges of V(SCO). Timing waveform XO(t) may be periodic with a period corresponding to a sample rate at which an external circuit periodically requests values of O(k) by requesting a sequence of N bits via V(SCO). Accordingly, timing waveform XO(t) corresponds to a selected output sample rate. Timing waveform V(CNV) corresponds to a selected input sample rate. In this example, configuration code CC represents a selected sample-rate ratio SRR (input sample rate divided by output sample rate).

An exemplary 5-bit counter circuit 602 counts rising edges of timing waveform V(CNV). Counter circuit 602 provides a 5-bit binary count code that wraps around when it reaches a maximum value (overflow). The 5-bit binary count code represents sequence index n of I(n) modulo 32. Counter circuit 602 is equivalent to an integrator circuit (a circuit that provides an integration operation) that receives a constant input value of one, and which is clocked by timing waveform V(CNV). This observation is useful to recognize that circuit 600 is a first-order CIC filter with a constant input value of one and configured according to the paper by Hogenauer. Specifically, exemplary 5-bit latch circuits 603, 604 and subtraction circuit 605 is a comb filter that receives the 5-bit count code and provides configuration code CC=SRR. The comb filter is clocked at rising edges of timing waveform XO(t), and it operates at the selected output sample rate. Subtraction circuit 605 provides an arithmetic operation (subtraction) that is calculated modulo 32 in accordance with the paper by Hogenauer.

In addition to the paper by Hogenauer, CIC filter circuits are described in literature including journal papers, text books, and patents. Persons skilled in the art will recognize that a first-order CIC filter with a constant input value of one outputs an encoded representation of an input sample rate divided by an output sample rate. Accordingly, configuration circuit 600 derives a configuration code CC representing a sample-rate ratio in response to a timing pattern of V(CNV) and V(SCO) for inputting values I(n) to and requesting values O(k) from a configurable signal-processing circuit 400B.

Configuration circuit 600 provides a configuration code CC that facilitates selecting a predefined signal-processing operation for each selectable sample-rate ratio. Accordingly, a signal-processing operation provided by configurable signal-processing core circuit 403 in FIG. 4B may be a function of a sample-rate ratio CC=SRR that is selectable by requesting symbols to be output via a serial interface (terminal SDO) in accordance with a predefined timing pattern. Another exemplary configuration circuit (described later) may be used to select one of several predefined signal-processing operations for each selectable sample-rate ratio.

Configuration circuit 600 may be in a self-configuring analog-to-digital converter circuit (400B of FIG. 4B) selectively providing one of a plurality of selectable signal-processing operations, for example a decimation-filter signal-processing operation. For example, circuit 403 of FIG. 4B may be a configurable decimation-filter circuit that receives a configuration code CC=SRR provided by configuration circuit 404 implemented according to FIG. 6A. A bit-width of circuits 602, 603, 604, and 605 may be increased as needed.

In one exemplary embodiment, configurable circuit 403 may operate as a first-order SINC filter for any sample-rate ratio up to a predefined maximum value, say SRR≤65,536. The first-order SINC filter may be implemented as a first-order CIC filter described by Hogenauer. FIG. 6 in the paper by Hogenauer shows a multiplexer circuit that provides a configurable scaling operation, which may be responsive to configuration code CC=SRR. The configurable scaling operation may be limited to scaling by factors that are a power of 2. Accordingly, a particular scaling factor may be provided for any one of a plurality of configuration codes CC=SRR.

In another exemplary embodiment, configurable circuit 403 may operate as a first-order SINC decimation filter for any selected sample-rate ratio (configuration code CC=SRR) comprised in a predefined first group of values, say {1024, 512, 256}, and as a second-order SINC decimation filter for any selected sample-rate ratio comprised in a predefined second group of values, say {128, 64, 32}, and as a third-order SINC decimation filter for any selected sample-rate ratio comprised in a predefined third group of values, say {16, 8, 4}. A frequency response of a SINC decimation filter has a substantial droop. It is well known that a decimation filter may be configured as a cascade of several decimation-filter circuits. For example, a multi-stage decimation-filter circuit may be a cascade configuration of a third-order SINC decimation-filter circuit operating with a selectable first sample-rate ratio SRR1 and a two-stage decimation-filter circuit operating with a fixed second sample-rate ratio SRR2=6. An overall sample-rate ratio is SRR=SRR1·SRR2=6·SRR1. A frequency response of the two-stage decimation-filter circuit may be provided (designed) to substantially flatten an overall frequency response of the multi-stage decimation-filter circuit in a signal band. Configurable circuit 403 may operate as a multi-stage decimation filter for any selectable sample-rate ratio divisible by a predefined number 3 comprised in a predefined fourth group of values, say {96, 48, 24}.

Persons skilled in the art will recognize that an operation of circuit 600 of FIG. 6A may be provided by other circuits configured differently. For example, circuit 602 may be substituted by a general-purpose integrator circuit receiving any constant input value. An exemplary bit-width of 5-bit circuits 602, 603, 604, and 605 may be greater or smaller. Hogenauer describes how to select a sufficient bit-width for CIC filters. An operation of a CIC filter may be equivalent to that of a SINC filter configured differently. For example, counter circuit 602 may be reset to zero (or another predefined value) at each rising edge of XO(t) after transferring a counted value to latch circuit 603. Latch circuit 603 then provides configuration code CC=SRR, circuits 604 and 605 may be removed, and overflow properties (saturation, modulo-type, or otherwise) of counter circuit 602 may be not important.

Persons skilled in that art will also recognize that it may be preferable to impose timing specifications/requirements to avoid well-known timing-related problems, including (but not limited to) ambiguity and meta stability. For example, timing-related problems may occur if divide-by-N circuit 601 in FIG. 6A is configured differently to align rising and falling edges of XO(t) with falling (as opposed to rising) edges of V(SCO), which may be equivalent to delaying exemplary timing waveform V(SCO) in FIG. 5. Such a change may cause rising edges of XO(t) to substantially coincide with rising edges of V(CNV), which may cause ambiguity for a code transferred to latch circuit 603. For example, a count code may or may not account for a rising edge of V(CNV) that may occur substantially when latch circuit 603 is clocked by XO(t). Furthermore, if latch circuit 603 is clocked when or while a count code provided by circuit 602 changes, then a false code may be loaded into latch circuit 603. For example, a transition of a count code from '10111' to '11000' may cause meta-stability, and only a most significant bit of the count code may be loaded reliably into latch circuit 603. It is a familiar task for persons skilled in the art to analyze and prevent potential timing-related problems, including (but not limited to) imposing one or more timing requirements.

An exemplary embodiment may self-configure a phase property for a signal-processing operation. Consider again circuit 400B of FIG. 4B and the exemplary timing diagram shown in FIG. 5 for SRR=4. Timing waveform WO(t) is derived by circuit 403 from timing waveform WI(t)=V(CNV) based on configuration code CC. For the exemplary sample-rate ratio of SRR=4, a phase property for timing waveform WO(t) may have one of SRR=4 distinct values. A rising edge of timing waveform WO(t) may occur at one of SRR=4 distinct time instances T(3), T(4), T(5), or T(6) shown in FIG. 5.

Ambiguity of a phase property for WO(t) may correspond to ambiguity of a phase property for a selected signal-processing operation. For example, if circuit 403 is configured to operate as a first-order SINC decimation filter, then output values may be O(k)=I(4·k−p−3)+I(4·k−p−2)+I(4·k−p−1)+I(4·k−p), where an ambiguous value of p in {0,1,2,3} represents an ambiguous phase property for the selected signal-processing operation. Ambiguity of a phase property for a selected signal-processing operation may be acceptable for some embodiments. Other embodiments may prefer or need to select the phase property. It may be preferable to not dedicate a terminal for that purpose.

An exemplary embodiment may self-configure a phase property for a digital serial interface circuit. Consider again circuit 400B of FIG. 4B and the exemplary timing diagram shown in FIG. 5 for SRR=4. Ambiguity of a phase property for timing waveform WO(t) may cause ambiguity for boundaries of codes output serially as V(SDO) in response to V(SCO). Separation markers may be inserted in a stream of bits output as V(SDO) for some embodiments (FIG. 3B). For other embodiments, it may be preferable to not do so. It may be also preferable to avoid dedicating a terminal to receive or provide a timing waveform to indicate boundaries for codes. It may be also preferable to facilitate that an external circuit can select code boundaries.

Selecting a phase property for a circuit or operation may be herein referred to as synchronizing the circuit or operation. A circuit or operation that self-configures a phase property may be herein referred to as a self-synchronizing circuit or operation.

An exemplary embodiment may be self-synchronizing in the sense that a phase property is selected by timing properties for communication of I(n) and/or O(k). A self-synchronizing circuit may synchronize a signal-processing operation and/or boundaries for multi-symbol codes communicated (input or output) via a serial interface. An advantage of a self-synchronizing circuit is that it automatically resumes proper operation if it somehow were to enter an erroneous mode of operation (which may be caused by a power-supply glitch, radiation, or otherwise).

Exemplary timing diagram of FIG. 5 shows how many bits that are requested by rising edges of V(SCO) for time intervals that are limited by two neighboring rising edges of V(CNV). FIG. 6B shows an exemplary symbol-request-counting circuit 610 for counting a number of bits (symbols) requested for each time interval. Similar to circuit 600 of FIG. 6A, circuit 610 may be characterized as a first-order CIC filter with a constant input. Divide-by-N circuit 601 of FIG. 6A is removed in FIG. 6B, and timing waveforms V(SCO) and V(CNV) are interchanged.

Circuit 610 provides a sequence of symbol-request-count values SRC(n), which is updated at each rising edge of timing waveform V(CNV). An exemplary sequence SRC(n) is shown in FIG. 5. A non-constant symbol-request-count sequence SRC(n) may indicate a selected phase property for synchronizing a signal-processing operation and/or a digital serial interface circuit. For example, low-high-low pulses of timing waveform WO(t) may be synchronized with time intervals for which a number of requested bits is greater than that of an immediately preceding time interval. In the example of FIG. 5, 2 bits are requested during each of time intervals [T(2);T(3)] and [T(6);T(7)], and 4 bits are requested during each of time intervals [T(3);T(4)] and [T(7);T(8)]. Accordingly, low-high-low pulses of WO(t) may be synchronized with time intervals [T(3);T(4)] and [T(7);T(8)], so that rising edges of WO(t) occur at T(3) and T(7). Furthermore, T(3) and T(7) correspond to boundaries for codes output as V(SDO).

Figure 7A:
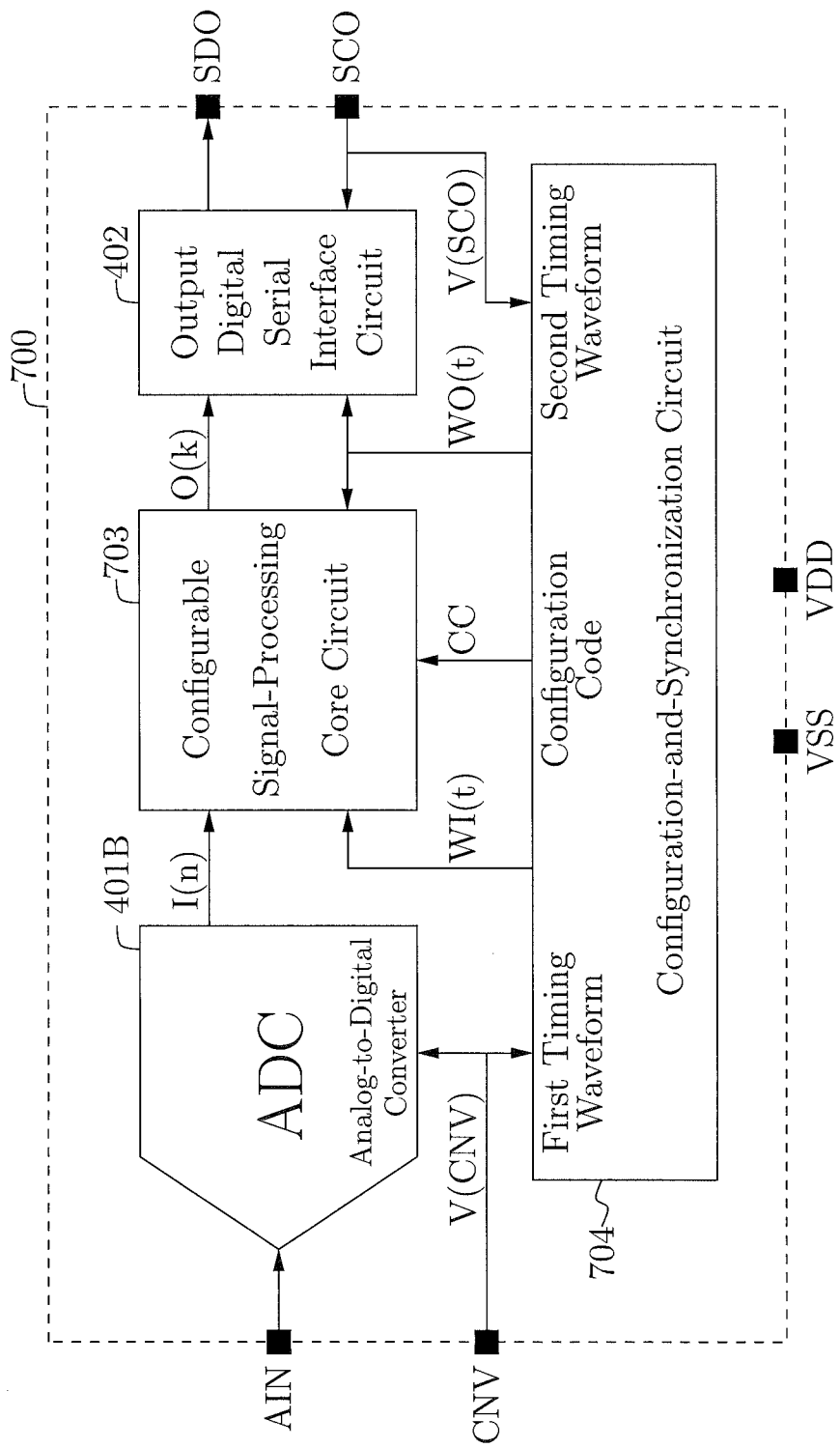
FIG. 7A shows an exemplary embodiment of a self-configuring and self-synchronizing configurable signal-processing circuit.

FIG. 7A shows an exemplary embodiment of a self-configuring and self-synchronizing configurable signal-processing circuit 700. Configurable signal-processing circuit 700 is similar to circuit 400B of FIG. 4B, except that a configurable signal-processing core circuit 703 now receives timing waveforms WI(t) and WO(t), not just WI(t) as in FIG. 4B. A configuration-and-synchronization (configuration) circuit 704 receives applied timing waveforms V(CNV) and V(SCO), and provides timing waveforms WI(t) and WO(t)

in response to a timing pattern of V(CNV) and V(SCO). Timing waveform WO(t) is further provided to output digital serial interface circuit 402. As for circuit 400B, timing waveform WI(t) may be substantially equal to V(CNV).

A phase property for a signal-processing operation of circuit 703 may correspond to phase properties of timing waveforms WI(t) and WO(t). Boundaries of codes output via terminal SDO by digital serial interface circuit 402 corresponds to a phase property of WO(t). Phase properties for WI(t) and WO(t) are selected by an external circuit (not shown) by applying timing waveforms V(CNV) and V(SCO) in accordance with a predefined timing pattern. A predefined signal-processing operation of circuit 700 is also selected by the external circuit via timing waveforms V(CNV) and V(SCO). Timing diagram of FIG. 5 is exemplary for FIG. 7A as well as for FIG. 4B.

Figure 7B:
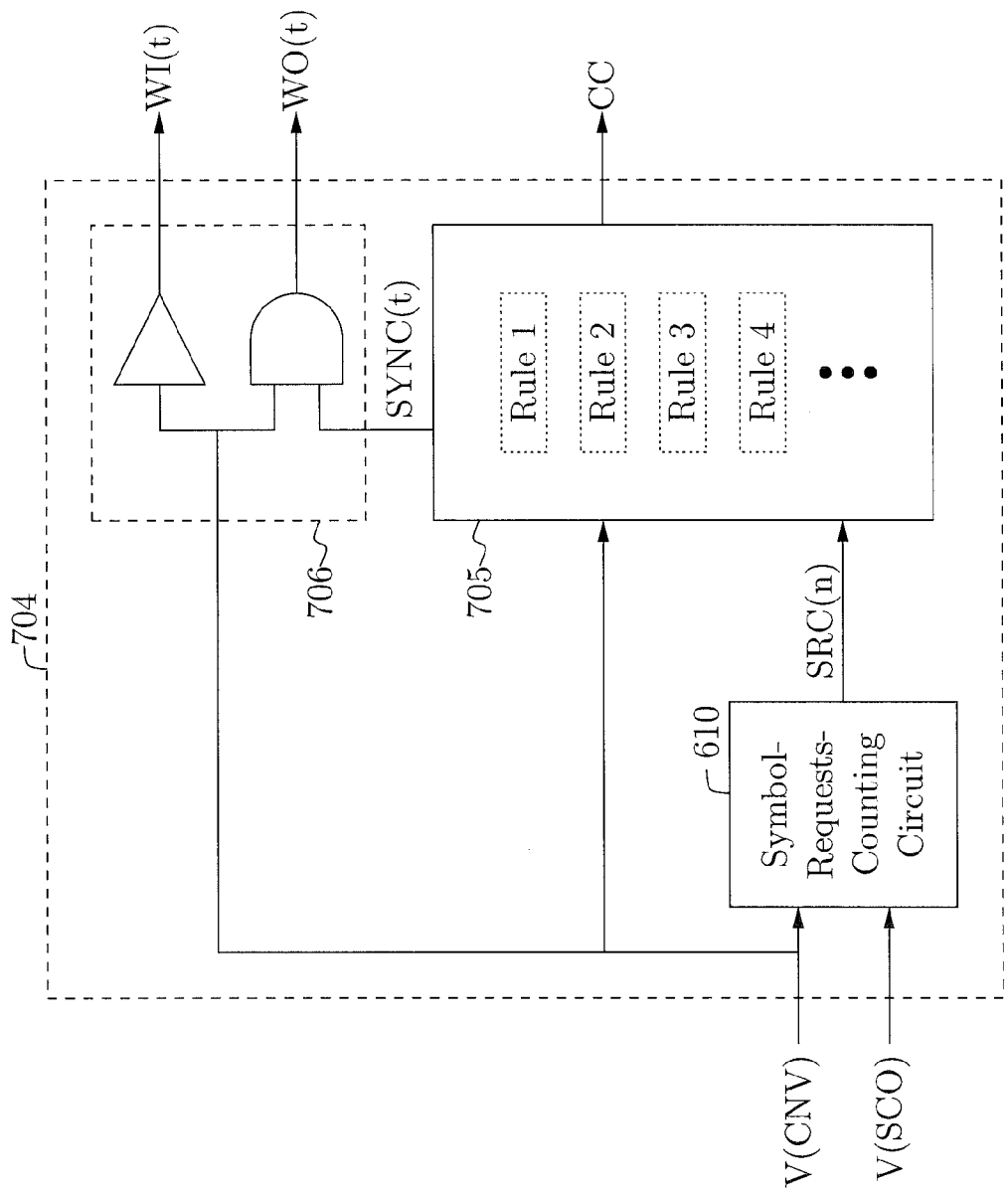
FIG. 7B shows the configuration-and-synchronization circuit in FIG. 7A in more detail.

FIG. 7B shows configuration-and-synchronization circuit 704 of FIG. 7A in more detail. Exemplary circuit 704 comprises the described symbol-request-counting circuit 610 (FIG. 6B), a decoder circuit 705, and logic circuits (commonly called logic gates) 706. Decoder circuit 705 may be implemented as a state-machine circuit. State-machine circuits are well known, and may be commonly called finite-state-machine circuits. An operation of a state-machine circuit may be described in a hardware description language (HDL) such as Verilog. A Verilog or other HDL description of decoder circuit 705 may be synthesized using commercially available software tools to provide a transistor-level schematic and a layout for a physical integrated circuit chip.

Exemplary decoder circuit 705 receives a symbol-request-count sequence SRC(n) from circuit 610, which is updated at rising edges of V(CNV). For each update (for each value of sequence index n), a current and/or past values of SRC(n) are evaluated according to a plurality of predefined rules. Each rule provides a binary output, e.g., 1 (true) if the rule is fulfilled or 0 (false) if it is not fulfilled. Accordingly, a rule may be provided for testing SRC(n) for true or false. A rule may evaluate (test, compare) any number of values of SRC(n) at positions relative to a current (instantaneous) value of sequence index n. For example, SRC(n−8) may be a first relative position of SRC(n), which is consecutive to a second relative position SRC(n−7) of SRC(n). Accordingly, a rule may be a test applied to a history of sequence SRC(n), for example to 10 most recent values of SRC(n). Each rule of circuit 705 represents a predefined timing pattern for V(CNV) and V(SCO) via properties of circuit 610. Configuration code CC provides an index for (points to) the rule that was fulfilled most recently (starting with a default value at a power-on reset event).

An exemplary embodiment may provide two rules for decoder circuit 705. An exemplary first rule (rule 1) is fulfilled only if (SRC(n−3)=4) and (SRC(n−2)=4) and (SRC(n−1)=4) and (SRC(n)=2). An exemplary second rule (rule 2) is fulfilled only if (SRC(n−3)=4) and (SRC(n−2)=4) and (SRC(n−1)=3) and (SRC(n)=3). Consider again the exemplary timing diagram of FIG. 5 and assume that SRC(n) is a periodic extension of [4,4,4,2]. Rule 1 is fulfilled for time interval [T(7);T(8)], and by periodic extension for all time intervals [T(4·k−1);T(4·k)] for integer values k. In this example, rule 2 is never fulfilled. Configuration code CC points to rule 1 as the rule that was fulfilled most recently. The time intervals for which rule 1 is fulfilled represents a selected phase property, which may be used to synchronize waveforms WI(t) and WO(t). Accordingly, an external circuit may apply timing waveforms V(CNV) and V(SCO) in a timing pattern that fulfills one of several predefined rules from time to time.

A time interval for when a rule is fulfilled may correspond to a selected phase property. A selected signal-processing operation and/or boundaries for codes may be synchronized responsive to when a rule is fulfilled. An index for a rule that was fulfilled most recently may correspond to a selected signal-processing operation. For example, rule 1 may select a first-order SINC decimation filter operating at SRR=4. Rule 2 may select a two-stage decimation filter operating at SRR=4. A two-stage decimation filter may comprise two decimate-by-2 half-band filters providing a substantially flat frequency response in a signal band.

Figure 8:
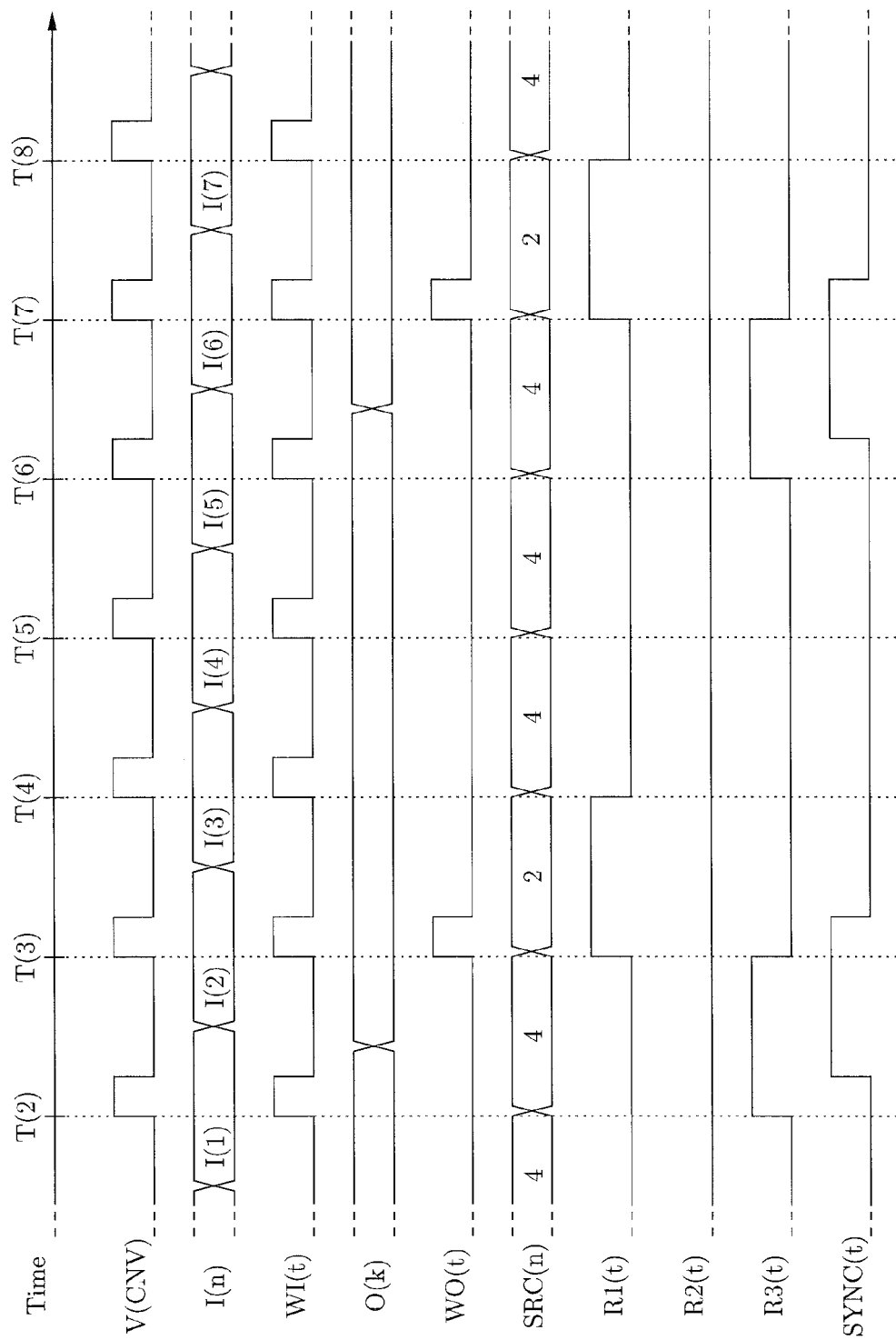
FIG. 8 shows an exemplary timing diagram based on FIG. 5 including an exemplary synchronization waveform and waveforms indicating when exemplary rules 1 and 2 are fulfilled.

Decoder circuit 705 provides a single-bit synchronization sequence SYNC(n) that is represented by a timing waveform SYNC(t). Timing waveform SYNC(t) is updated at falling (as opposed to rising) edges of V(CNV). SYNC(n) represents a selected phase property and sample-rate ratio. Timing waveform WO(t) is derived by combining applied timing waveform V(CNV) and synchronization waveform SYNC(t) by a Boolean-logic operation (AND). Timing waveform WI(t) is derived by buffering logic levels of V(CNV), which is another Boolean-logic operation (X=X). Accordingly, a low-high-low pulse of V(CNV) is included in timing waveform WO(t) when SYNC(n) is true. Decoder circuit 705 provides synchronization sequence SYNC(n) to selectively include or skip low-high-low pulses of V(CNV) in timing waveform WO(t). Synchronization sequence SYNC(n) may be periodic with a period corresponding to a selected sample-rate ratio. SYNC(n)=0, 0, 1, 0, 0, 0, 1, 0, 0, 0, 1, 0, . . . is an example for SRR=4. A value of sequence index n for which SYNC(n) is 1 (true) may be a selected phase property. All low-high-low pulses of V(CNV) are included in timing waveform WI(t). FIG. 8 shows an exemplary timing diagram based on FIG. 5 that includes an exemplary synchronization waveform SYNC(t).

SYNC(n) may be true when a rule is fulfilled with a rule-specific offset in time (relative position). FIG. 8 shows an exemplary timing diagram including waveforms R1(t) and R2(t) representing sequences R1(n) and R2(n) that indicate when the exemplary rules 1 and 2 are fulfilled. Exemplary synchronization waveform SYNC(t) corresponds to a rule-1-specific delay of 3 samples. Rule 1 may be substituted by a substantially equivalent exemplary rule 3. Rule 3 is fulfilled only if (SRC(n−3)=2) and (SRC(n−2)=4) and (SRC(n−1)=4) and (SRC(n)=4). A rule-3-specific delay for deriving SYNC(t) is zero samples (see FIG. 8).

Symbol-request-counting circuit 610 of FIG. 6B is an example of a timing-pattern-to-digital converter (TPDC) circuit. Time instances identified by timing waveforms (e.g., time instances for transitions of timing waveforms) are physical quantities that a TPDC circuit converts into a digital sequence. A TPDC circuit may provide a sequence of codes that represents a sequence of values, a sequence of vector values, or otherwise. A TPDC circuit may comprise timing-based circuits including, but not limited to, delay cells, phase detectors, pulse generators, delay-locked loops, phase-locked loops, phase integrators, fixed-frequency or controlled oscillators, mixers, and/or time-to-digital converters.

Circuit 610 is an exemplary TPDC circuit that may be constructed from basic circuit blocks that are commonly used for a variety of digital circuits. Circuit 610 may be characterized as a state-machine circuit that is responsive to a plurality of timing waveforms. A decoder circuit may provide a rule that in combination with properties of a TPDC circuit tests for whether or not one or more timing waveforms match a predefined timing pattern.

A plurality of rules provided by an exemplary decoder circuit 705 (FIG. 7B) may be mutually exclusive in the sense that no more than one rule may be fulfilled at any one time. An order of precedence may be provided to ensure that rules are mutually exclusive. For example, any lower-ranking rule may be false by an order of precedence when any higher-ranking rule is fulfilled. Each rule may block lower-ranking rules for a predefined number of samples. Several exemplary rules for decoder circuit 705 will be described next. The exemplary rules may be provided in various combinations in several embodiments. The exemplary rules are not necessarily mutually exclusive, as they are not intended to be provided collectively in a single decoder circuit.

Exemplary rules 1, 2, 3 described above each test for a specific pattern. Rule 1 tests for a first pattern P1=[4,4,4,2]. Rule 2 tests for a second pattern P2=[4,4,3,3]. Rule 3 tests for a third pattern P3=[2,4,4,4]. In this notation, a last element of a pattern, e.g. last(P1)=2, corresponds to a test for a most recent value of SRC(n). Rules 1 and 3 may be substantially equivalent except for a phase property. A length of a pattern, e.g., length(P1)=4, corresponds to a length of a history of SRC(n) that is being evaluated by a rule. A specific predefined pattern of a predefined length may be referred to as a unique pattern.

Exemplary rules 4, 5, 6, 7, 8, 9, 10, 11 may test for unique patterns P4=[3,3,3,2,2,2,3,0], P5=[3,3,3,2,2,3,2,0], P6=[3,3,3,2,3,2,2,0], P7=[3,3,3,2,3,3,1,0], P8=[3,3,3,3,2,2,2,0], P9=[3,3,3,3,2,3,1,0], P10=[3,3,3,3,3,2,1,0], P11=[3,3,3,3,3,3,0,0]. Rules 4 through 11 are distinct beyond a phase property (periodic extensions of the patterns are distinct). In one example, each one of the rules 4-11 may select a distinct predefined decimation filter operating at a sample-rate ratio of 8. In another example, each rule 4-11 may select a distinct frequency response in a signal band. In another example, each rule 4-11 may select a distinct signal band. A selectable signal band may include frequencies within a second-or-higher Nyquist zone with respect to an output sample rate of O(k). In another example, each rule 4-11 may select a distinct sample-rate ratio, say 8, 12, 16, 24, 32, 48, 64, 128.

Each rule 4-11 tests for a single predefined unique pattern. Such specific rules may facilitate an external circuit to select one of several (potentially many) predefined signal-processing operations for a particular sample-rate ratio. Distinct rules may select distinct phase properties for a selected signal-processing operation and sample-rate ratio. Having relatively many distinct rules may facilitate independent selection of a type of signal-processing operation, a sample-rate ratio for the selected type of signal-processing operation, a phase property for the selected signal-processing operation, and a phase property for a digital serial interface circuit. A phase property for a digital serial interface circuit need not be linked to a phase property for a selected signal-processing operation.

Other exemplary rules may be generic rather than specific. For example, a generic rule may be fulfilled if a history of SRC(n) matches any one of a number of predefined patterns. Generic rules may allow an external circuit flexibility to communicate at a low symbol rate if necessary (e.g., a limited-resource external circuit may be not able to communicate at a high symbol rate), or at a higher symbol rate if that is possible and preferred. Some embodiments may provide a digital serial interface circuit that may be cascaded with one or more external digital serial interface circuits in a well-known chain-type configuration. A generic rule may be provided to allow for a variable (not predefined) number of symbols to be communicated for each period of an output sample rate (e.g., to accommodate chain-type configurations). Generic rules may be provided to accommodate various types of flexibility that may be preferred or needed for an embodiment.

An exemplary rule 12 tests for $SRC(n) \geq Q$, where Q is a predefined number. In one example, rule 12 may select a predefined signal-processing operation for a sample-rate ratio of SRR=1. For example, rule 12 may select a low-pass filter operation. Rule 12 tests for a generic pattern, as it is fulfilled for SRC(n)=Q, or SRC(n)=Q+1, SRC(n)=Q+2, et cetera. Rule 12 evaluates a history of sequence SRC(n) of a length one.

An exemplary rule 13 tests for a generic pattern P13=[Q1,Q2] where Q1>Q2. Any number of symbols may be communicated during a period of an output sample rate. A signal-processing operation may be selected responsive to a difference value Q12=Q1−Q2. A predefined difference value Q12 may correspond to a rule branched from rule 13. For example, a rule 13-8 may correspond to rule 13 for Q12=8, and a rule 13-16 may correspond to rule 13 for Q12=16. Rule 13 evaluates a history of sequence SRC(n) of a length two. A sample-rate ratio of a signal-processing operation selected by rule 13 may be SRR=2. For example SRC(n)=16, 8, 16, 8, 16, 8, . . . may select a first-order SINC decimation filter for SRR=2 according to rule 13-8. Another sequence SRC(n)= . . . , 24, 16, 24, 16, 24, 16, . . . may also select the first-order SINC decimation filter for SRR=2 according to rule 13-8. Another sequence SRC(n)= . . . , 24, 8, 24, 8, 24, 8, . . . may select a half-band decimation filter providing a substantially flat frequency response in a signal band for SRR=2 according to rule 13-16.

An exemplary rule 14 tests for a generic pattern P14=[Q1,Q2,0] where Q1>0. A value of Q2 may select a predefined signal-processing operation for SRR=3. Alternatively, or in combination, Q2 may select a sample-rate ratio, e.g., SRR=Q2. Accordingly, a plurality of rules (rules 14-Q2) may branch from rule 14. A predefined code last(P14)=0 may indicate inactivity for a serial interface. Another code first(P14)=Q1>0 may indicate activity for the serial interface. A transition from activity to inactivity may indicate a phase property for synchronizing a signal-processing operation and/or boundaries for codes communicated via the serial interface.

An exemplary rule 15 tests for a plurality of generic patterns of a variable length up to a predefined maximum length, which may be a million samples or longer. Exemplary rule 15 may be based on an event sequence, such as E(n)=(SRC(n−1)<SRC(n)). Exemplary branch rules 15-L may correspond to a spacing L of two events (E(n−L)=1) and (E(n)=1) separated by non-events, i.e., E(n−p)=0 for all integer values 0<p<L. Spacing L may be determined by counting. Spacing L may correspond to a selected sample-rate ratio SRR=L. In one example, a selected signal-processing operation may be a function of SRR=L. In another example, each branch rule 15-L may have branch-of-branch rules that are responsive to one or more specific values of SRC(n) to select one of several predefined signal-processing operations for a particular SRR=L. For example, a value Q of SRC(n)=Q at an event E(n)=1 may select a predefined type of signal-processing operation (rule 15-L-Q). Compare event sequence E(n) to synchronization sequence SYNC(n).

An exemplary rule 16 may be the same as rule 15, except that it provides a different definition of an event sequence E(n)=((SRC(n−1)=0) and (SRC(n)>0)). Events may indicate transitions from inactivity to activity for a serial interface.

Rule 16 allows substantial flexibility for providing rules branched from rule 16. For example, many branched rules may be provided that accommodate a potential need to keep a maximum symbol rate low (say SRC(n)≤2 for all n).

An exemplary rule 17 may be the same as rule 15, except that it provides a different definition of E(n)=(((SRC(n−1)=0) and (SRC(n)>0)) or (SRC(n)>Q)), where Q is a predefined value. Rule 17 allows for two events (E(n−L)=1) and (E(n)=1) to be spaced by any positive integer number L, including 1. Accordingly, rule 17 may be used to select a sample-rate ratio SRR=L of 1 or higher.

A length of a pattern/history tested by a rule need not be equal to a sample-rate ratio for a signal-processing operation selected by the rule. For example, rule 14 may select a signal-processing operation for SRR=8, and an exemplary symbol-request-count sequence fulfilling rule 14 may be SRC(n)= . . . , 0, 0, 8, 8, 0, 0, 0, 0, 0, 0, 8, 8, 0, 0, 0, . . . . In one example, an exemplary decoder circuit may be clocked at any sample rate, including (but not limited to) an input sample rate of I(n) or an output sample rate of O(k). In another example, an exemplary decoder circuit may comprise a plurality of decoder circuits clocked at distinct sample rates. Each distinct decoder circuit may be coupled to a distinct TPDC circuit providing a sequence of codes at a corresponding sample rate.

A pattern for one or more timing waveforms may be defined with respect to a pattern-identification sequence of codes derived from the one or more timing waveforms by a timing-pattern-to-digital converter (TPDC) circuit. A decoder circuit may provide a predefined first rule for testing the pattern-identification sequence of codes to determine whether or not the one or more timing waveforms match a predefined first timing pattern defined by the TPDC circuit and the first rule. Persons skilled in the art will recognize that TPDC circuits and rules for defining timing patterns may be provided to accommodate almost any need or preference for a signal-processing application. A number of possible variations may be substantially unlimited.

Codes in a pattern-identification sequence may represent integer values according to a well-known encoding scheme. More generally, integer values may be assigned to codes of substantially any type and encoding. Exemplary rules 1 through 17 may be applied with respect to any codes representing integer values. Alternatively, rules (including but not limited to exemplary rules 1-17) may be defined and applied with respect to a predefined order of precedence for codes, without necessarily assigning numerical values to codes. For example, a plurality of possible codes of any type (distinguishable permutations of symbols) may be ranked in a predefined order of precedence, and a test may compare two codes with respect to the predefined order of precedence. A test (SRC(n−1)<SRC(n)) may compare ranks of a first code SRC(n−1) and a second code SRC(n) with respect to the predefined order of precedence. Testing a code SRC(n) for equality with respect to a code X, i.e., (SRC(n)=X), determines whether or not code SRC(n) is distinguishable from code X. Code X may be a predefined code, or it may be a code SRC(n−q) at a relative position in sequence SRC(n). A code may indicate a property, such as activity or inactivity on a serial interface.

A configuration of some embodiments (e.g., a configuration code CC) may be substantially constant, and properties for a transition from one configuration to another configuration may not be important. Other embodiments may be used for applications that reconfigure a signal-processing operation relatively frequently. A signal-processing operation may have an element of memory (e.g., an impulse response) that exceeds a period of a sample rate. In an exemplary embodiment, a configurable signal-processing core circuit may be reset when an external circuit selects a new configuration. For example, with reference to FIG. 7A, circuit 704 may provide a reset pulse (not shown) to circuit 703 if or when a configuration code CC and/or a phase property of WI(t) or WO(t) changes.

Figure 9:
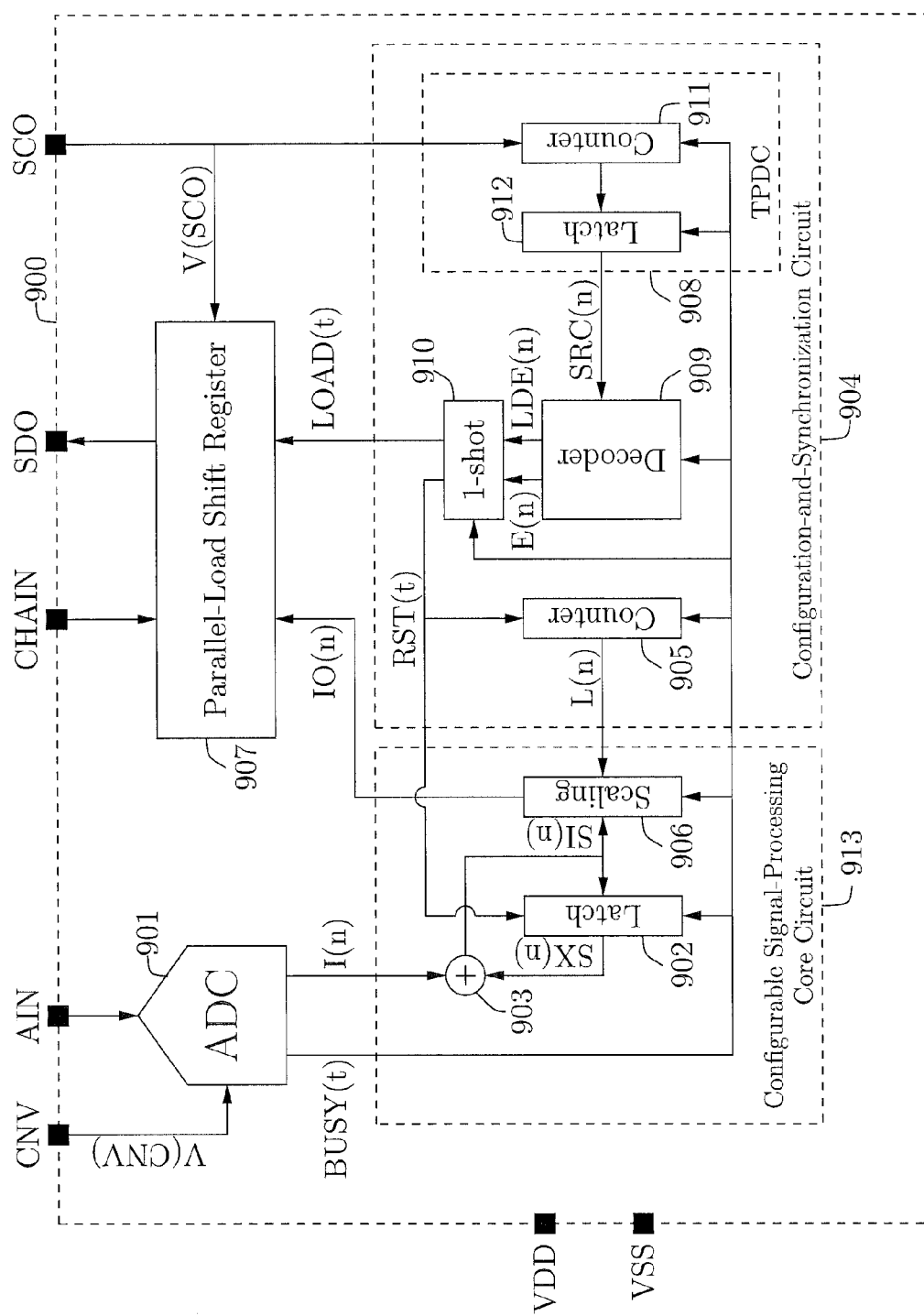
FIG. 9 shows an exemplary configurable signal-processing circuit that may be configured independently for each output value.

FIG. 9 shows an exemplary configurable signal-processing circuit 900 that may be configured independently for each output value O(k). Each value O(k) is derived from a configuration-specific number L of input values I(n). A configuration-specific sample-rate ratio SRR(k)=L may characterize O(k) for a single value of sequence index k. For example, a first output value may be O(1)=(I(1)+I(2))/2. A second consecutive output value may be O(2)=I(3). A third consecutive output value may be O(3)=(I(4)+I(5)+I(6)+I(7))/4. A fourth consecutive output value may be O(4)=(I(8)+I(9)+I(10))/4. A fifth consecutive output value may be O(5)=I(11). Et cetera. A corresponding sample-rate-ratio sequence is SRR(k)=2,1,4,3,1, . . . . Each output value O(k) is a scaled average value of a number SRR(k) of preceding most-recent input values I(n). This is an example of a FIR-type decimation-filter operation, for which an output value O(k) is a weighted sum of a plurality of input values I(n).

A scaling factor may be a smallest power of 2 equal to or larger than SRR(k). For example, O(4)=O(8)+I(9)+I(10))/4 as opposed to O(4)=O(8)+I(9)+I(10))/3. Circuit 900 is self-configuring and self-synchronizing, and it may be referred to as a flexible-SINC ADC circuit. Specifically, a length SRR(k) of a first-order SINC decimation-filter operation is responsive to a timing pattern for waveforms V(CNV) and V(SCO) applied by an external circuit (not shown).

Furthermore, a phase property of the first-order SINC decimation-filter operation is responsive to a timing pattern for V(CNV) and V(SCO). Furthermore, boundaries for codes output serially via terminal SDO are responsive to a timing pattern for V(CNV) and V(SCO).

An ADC circuit 901 may be similar or identical to ADC circuit 401B of FIG. 7A, and it provides a timing waveform BUSY(t). A rising edge of timing waveform V(CNV) initiates a conversion operation of ADC 901 and BUSY(t) transitions from a low state (logic-0) to a high state (logic-1). BUSY(t) remains high during the conversion operation, and it returns to the low state after the conversion completes within a maximum conversion time. The conversion operation provides an encoded value I(n) that is ready to be read at a falling edge of BUSY(t) when it returns to the low state. A commercial product, LTC2378-20 manufactured and sold by Linear Technology Inc., is an example of an ADC circuit that outputs a timing waveform BUSY(t) to indicate when a conversion operation is ongoing and when a digital value is ready. A data sheet is available for LTC2378-20. This document is incorporated herein by reference as an example of timing properties for an ADC circuit. For example, ADC 901 may be known to have a maximum conversion time, which may characterize a maximum duration from a rising edge of V(CNV) to a falling edge of BUSY(t).

A latch circuit 902 is clocked at rising edges of BUSY(t). Latch circuit 902 and an adder circuit 903 in combination provide an integration operation for sequence I(n) after a reset event. Latch circuit 902 is reset by a high state of a waveform RST(t) provided by a one-shot circuit 910. One-shot circuit 910 provides a low-high-low pulse at (or shortly after) rising edges of BUSY(t) when an event sequence E(n) is true. Reset waveform RST(t) is provided by a configuration-and-synchronization circuit 904 for synchronizing a configurable signal-processing core circuit 913. Adder circuit 903 outputs a sum sequence of values SI(n). Each value of SI(n) is a sum of values I(n) provided by ADC 901 since a most-recent reset event.

Figure 10:
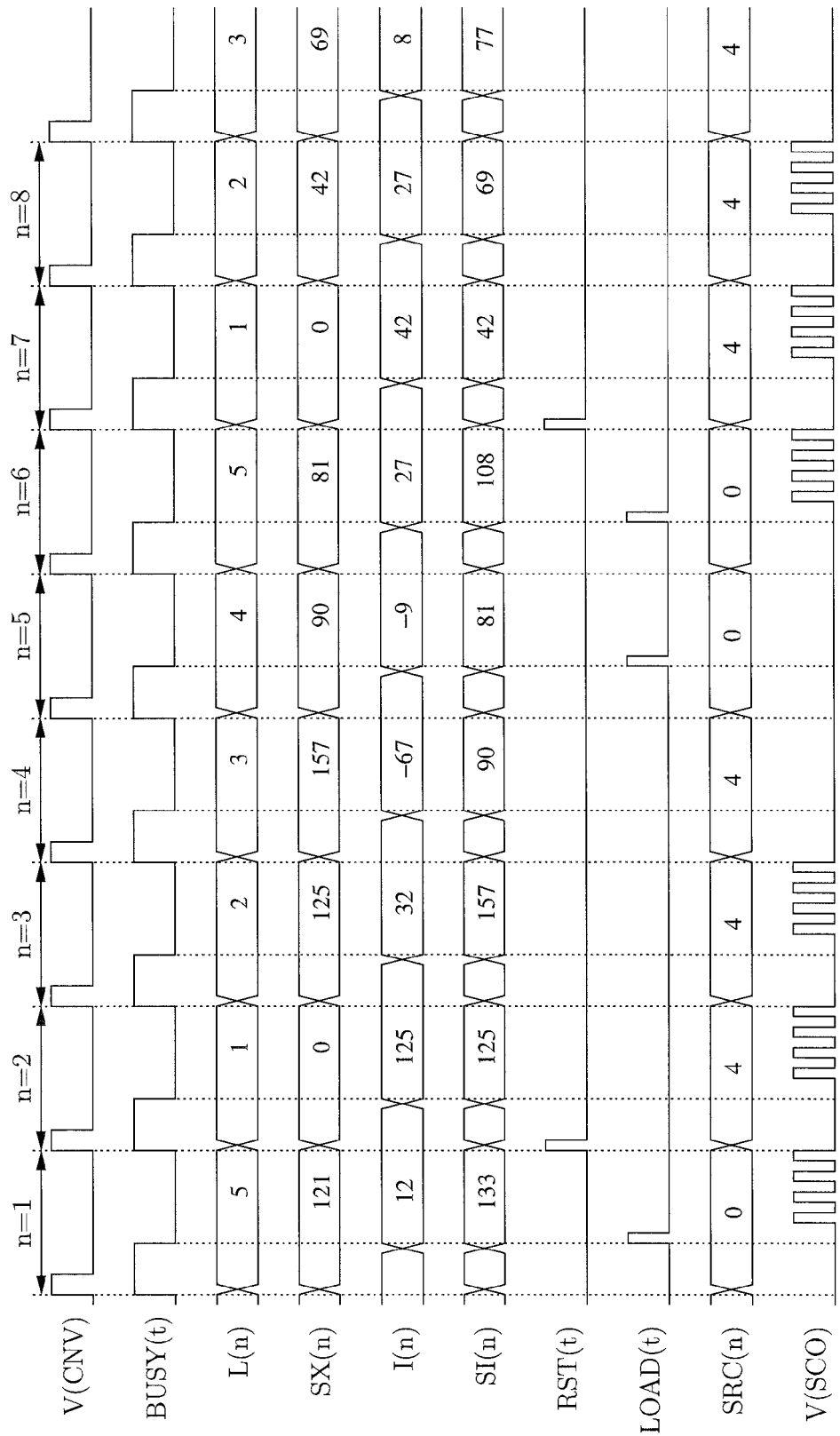
FIG. 10 shows an exemplary timing diagram for the exemplary circuit of FIG.

FIG. 10 shows an exemplary timing diagram for circuit 900. Latch 902 is reset to zero for n=2 and n=7, so that SX(2)=0 and SX(7)=0. Exemplary values I(1)=12, I(2)=125, I(3)=32, I(4)=−67, I(5)=−9, I(6)=27, and I(7)=42 may be provided sequentially by ADC 901. A relationship, SI(n)=SX(n)+I(n), SX(n)=SI(n−1), is recursive when latch 902 is not reset. In this example, SI(2)=SX(2)+I(2)= I(2)=125 and SI(3)=SI(2)+I(3)=157 and SI(4)=SI(3)+ I(4)=90 and SI(5)=SI(4)+I(5)=81 and SI(6)=SI(5)+ I(6)=108. Due to a reset of latch 902 for n=7, SX(7)=0, a next value is SI(7)=SX(7)+I(7)=I(7)=42. Boundaries (a phase property) of the integration (first-order SINC) operation provided by circuits 902 and 903 are selected by reset events provided by configuration-and-synchronization circuit 904 via waveform RST(t). Accordingly, circuit 904 synchronizes a signal-processing operation of flexible-SINC ADC circuit 900.

A counter circuit 905 is reset to a numerical value 1 by a high state of waveform RST(t). Counter circuit 905 provides a sequence of codes representing a sequence of numerical values L(n). Numerical values L(n) is a count of rising edges of BUSY(t), which represents a number of values I(n) included in a sum value SI(n). See exemplary timing diagram of FIG. 10.

A scaling circuit 906 scales (e.g., by division) each value of sum sequence SI(n) by a scaling factor F(n) that is a predefined function of L(n). For example, IO(n)=SI(n)/F(n). Scaling circuit 906 may be a multiplexer circuit that scales values of SI(n) by scaling factors F(n) that are a power of 2. For example, a first value of scaling factor F(n) may be 1 when L(n) equals 1. A second value of scaling factor F(n) may be 2 when L(n) equals 2. A third value of scaling factor F(n) may be 4 when L(n) equals either 3 or 4. A fourth value of scaling factor F(n) may be 8 when L(n) equals either 5, 6, 7, or 8. A fifth value of scaling factor F(n) may be 16 when L(n) equals either 9, 10, 11, 12, 13, 14, 15, or 16. Et cetera.

Counter circuit 905 is an exemplary state-machine circuit that provides a tentative configuration code CC=L(n) indicating a tentative sample-rate-ratio for each value of sequence index n. An actual (selected) value of the configuration code CC=SRR(k) depends on a value n1 of sequence index n when a value of IO(n) is selected to be output as O(k) for a value k1 of sequence index k. In this example, CC=SRR(k1)=L(n1) and O(k1)=IO(n1). The value n1 of sequence index n is selected by a timing pattern for timing waveform V(SCO) requesting symbols (bits) to be output via a serial interface (terminal SDO). With reference to FIG. 10, an exemplary configuration code CC=L(6)=5 is selected by a rising edge of V(SCO) that is applied during a time interval for n=6, requesting an output value O(k1)=IO(n1) for n1=6. A scaling factor F(n1)=8 may be a smallest power of 2 greater than or equal to L(n1)=5. In this example, an output value O(k1) for a selected configuration is IO(n1)=SI(n1)/F(n1)=108/8 where SI(n1)=108 is a sum of a selected number L(n1)=5 of values of I(n) for n in {2,3,4, 5,6}. Accordingly, a configuration code CC=L(n1) provided by circuit 904 is responsive to a timing pattern for BUSY(t) and V(SCO) requesting symbols to be output via a serial interface (terminal SDO). A state-machine circuit (counter 905) transitions to a predefined state, L(n1+1)=1, in response to the signal-processing circuit 900 receiving a request for an output value O(k1)=IO(n1), i.e. a rising edge of V(SCO).

A parallel-load shift register 907 may operate as a digital serial interface circuit. A plurality of bits representing a value IO(n1) of IO(n) for a selected value n1 of sequence index n are loaded simultaneously (in parallel) into shift register 907 by a high state of a waveform LOAD(t). Rising edges of timing waveform V(SCO) shift bits in shift register 907 in a predefined direction towards terminal SDO. Accordingly, a code representing a numerical value O(k1)=IO(n1), which is loaded into register 907 by a high state of LOAD(t) for n=n1, may be output serially via terminal SDO as a waveform V(SDO) responsive to a request (a plurality of rising edges of V(SCO)) for the code. In one exemplary embodiment, shift register 907 may have a serial-shift input coupled to a terminal CHAIN to facilitate shift register 907 to operate in a chain-type configuration with an external shift register. Another exemplary embodiment may not provide the exemplary terminal CHAIN.

Exemplary configuration-and-synchronization circuit 904 comprises a timing-pattern-to-digital converter (TPDC) circuit 908, a decoder circuit 909, counter circuit 905, and one-shot pulse-generating circuit 910. TPDC circuit 908 comprises a counter circuit 911 and a latch circuit 912. Counter circuit 911 is reset to zero when BUSY(t) is high. Flexible-SINC ADC circuit 900 may provide timing specifications prohibiting rising edges of V(SCO) to be applied for specified periods of time before and after a rising edge of V(CNV) is applied. Accordingly, timing specifications may prevent (by specification) rising edges of V(SCO) while BUSY(t) is high and counter 911 is being reset. A number SRC(n) of rising edges of V(SCO) that is counted by circuit 911 while BUSY(t) is low is loaded into latch 912 at each rising edge of BUSY(t) before resetting counter 911. Decoder circuit 909 may be a state-machine circuit that is clocked by BUSY(t). Counter 905 is shown separately from decoder circuit 909, but it may be viewed as being a part of decoder circuit 909. An event sequence E(n)=(((SRC(n−1)=0) and (SRC(n)>0)) or (SRC(n)>Q)) may be defined according to the described exemplary rule 17 for a predefined numerical value Q, say Q=19.

Exemplary timing diagram of FIG. 10 shows events occurring for n=2 and n=7, which resets circuits 902 and 905 as described. An event occurs for n=7 because SRC(7)=4>0 and SRC(6)=0. Decoder circuit 909 further provides a load-enable sequence LDE(n)=((SRC(n)=0) or (SRC(n)>Q)), which indicates when a read operation is complete. One-shot circuit 910 provides a low-high-low pulse LOAD(t) at falling edges of BUSY(t) when LDE(n)=1, which loads IO(n) into shift register 907 for n=5 and n=6. A value IO(6) overwrites a previous (not outputted) value IO(5) in shift register 907. The process of loading values into shift register 907 is disabled when LDE(n) is low during a digital serial communication transaction. A digital serial communication transaction starts when one or more bits are requested (SRC(n)>0)), and it completes when the serial interface becomes inactive (SRC(n)=0) or when a predefined minimum number of bits are requested (SRC(n)>Q) during one sample-to-sample period of I(n). A digital serial communication transaction may start and complete within one period when (SRC(n)>Q). Flexible-SINC ADC circuit 900 then operates as a Nyquist-type ADC outputting each conversion result O(k)=I(n) separately via V(SDO).

Flexible-SINC ADC circuit 900 may operate at a sample-rate ratio that exceeds a number of symbols (bits) output via terminal SDO during one digital serial communication transaction. Symbol-request-count sequence SRC(n) may then consist of only two distinct numerical values: 0 and 1. Accordingly, a maximum rate of symbols output via a serial interface (terminal SDO) may be equal to an input sample rate. A relatively low maximum symbol rate may be advantageous when a low-cost and/or low-power external circuit is not able to communicate at a high symbol rate. For example, a micro-controller (external circuit) may be limited to operate at a maximum symbol rate of 1 million bits per second. ADC circuit 901 may be configured to sample V(AIN,VSS) at an input sample rate of 1 million samples per second. Each numerical value of I(n) may be represented by a 20-bit code. Flexible-SINC ADC circuit 900 may operate with a constant sample-rate ratio of 32:1. Each numerical value of O(k) may be represented by a 24-bit code. Each code may be output in blocks of 24 bits responsive to 24 consecutive requests for bits spaced by one micro-second intervals, thus limiting an instantaneous symbol rate to a maximum of 1 million bits per second (as needed).

A structure of flexible-SINC ADC circuit 900 of FIG. 9 is similar to a structure of configurable signal-processing circuit 700 of FIGS. 7A and 7B. For example, TPDC circuit 908 may be compared to symbol-request-counting circuit 610 of FIG. 7B. Decoder circuit 909 and counter circuit 905 may be compared to decoder circuit 705 of FIG. 7B. One-shot pulse-generating circuit 910 may be compared to circuit 706 of FIG. 7B. However, there are also some differences. Other embodiments may have particular aspects and/or features, which may be different from aspects and features of exemplary embodiments described herein. For example, circuit 910 in FIG. 9 provides two waveforms, RST(t) and LOAD(t), which may be compared to waveform WO(t) in FIGS. 7A and 7B. Waveform LOAD(t) may provide one or more (including potentially millions of) pulses for loading one or more values IO(n) in shift register 907 for each value O(k). The one-or-more pulses may be compared to a single rising edge of WO(t) for loading a value of O(k) into digital serial interface circuit 402 in FIG. 7A. In FIG. 9, timing waveform BUSY(t) is derived from an applied timing waveform V(CNV) by a one-shot-type operation provided by ADC 901. In FIG. 7B, WI(t) is derived by buffering V(CNV), which may be equivalent to providing a direct connection WI(t)=V(CNV).

Flexible-SINC ADC circuit 900 is an exemplary embodiment that may be modified in many ways. For example, latch circuit 912 may be moved to be comprised within decoder circuit 909, or it may be removed entirely. In some embodiments, SRC(n) may represent a sequence of codes that are evaluated (sampled) at rising edges of BUSY(t). Waveforms representing codes for SRC(n) may not be steady except for short periods of time including when they are sampled. In some embodiments, counter circuit 911 may be reset by rising or falling edges of BUSY(t), as opposed to by a high state of BUSY(t).

A reset event may cause a state-machine circuit (e.g., counter 911) to transition to a predefined state. State-machine circuits may have a plurality of states that are equivalent for an operation, and a reset event may cause a state-machine circuit to transition to any one of several equivalent states. A plurality of equivalent states may be referred to collectively as a (single) state, including a predefined state.

TPDC circuit 908 in FIG. 9 may be substituted by TPDC circuit 610 of FIG. 6B by providing BUSY(t) in place of V(CNV). TPDC circuit 610 may be equivalent to TPDC circuit 908 in a modified configuration wherein counter circuit 911 is reset at rising edges of BUSY(t). Counter circuit 602 need not be reset, and circuit 602 may be not resettable. A rising edge of BUSY(t) provided in place of V(CNV) may cause TPDC circuit 610 to transition to a predefined state (any one of several equivalent states) so that its operation is equivalent to that of TPDC circuit 908 when counter circuit 911 is reset by rising edges of BUSY(t). A plurality of states of state-machine circuit 610 are equivalent for an operation thereof due to modulo-type properties of circuits 602 and 605. Removing latch 912 in FIG. 9 may be equivalent to removing latch 603 in FIG. 6B. Latch circuits 603 and 604 may be modified to be clocked by falling rather than by rising edges, which may be done to allow (by specification) activity on a serial interface for extended periods of time.

Persons skilled in the art will recognize that counter circuit 905 in FIG. 9 may be implemented similar to FIG. 6B (as described for counter circuit 911). Circuit 610 excluding latch 603 has a plurality of states that are equivalent to a predefined (reset) state of counter circuit 905. A counter circuit may be viewed as a circuit that provides an integration operation for a constant input value (e.g., 1). Circuits 902 and 903 in combination provide an integration operation, which may be reset by a high state of RST(t). A first-order CIC filter (described by Hogenauer) may be provided instead of circuits 902 and 903. A first-order CIC filter may provide an operation that is equivalent to that of circuits 902 and 903 when latch circuit 902 is modified to be reset by a rising (or falling) edge of RST(t), as opposed to by a high state of RST(t). A first-order CIC filter may transition to a predefined state (any one of several equivalent states) at a rising (or falling) edge of RST(t). One-shot circuit 910 may not be needed if latch circuit 902 is configured to be reset by an edge. Likewise, one-shot 910 may not be needed if a parallel-load operation of shift register 907 is triggered by an edge.

An exemplary decoder circuit 909 may be configured according to exemplary rule 17. For a sufficiently large value of Q (infinite), rule 17 may degenerate to exemplary rule 16, which may be provided without an explicit decoder circuit 909 for some embodiments. For example, an exemplary TPDC circuit may provide a single-bit indication of activity on a serial interface, such as X(n)=(SRC(n)>0). A TPDC circuit for deriving X(n) may provide a single-bit resettable latch circuit (not shown) in place of counter 911, and a single-bit latch circuit 912 for outputting X(n). Latch and counter circuits 902, 905 may be modified to be reset by rising edges of a waveform X(t) representing X(n), which may indicate a transition from inactivity X(n−1)=0 to activity X(n)=1 on a serial interface. Waveforms X(t) and BUSY(t) may be combined to derive a waveform LOAD(t) for loading values IO(n) in shift register 907 only when a digital serial communication transaction is complete, X(n)=0. Accordingly, some embodiments need not comprise an explicit decoder circuit 909.

Accordingly, the described exemplary embodiments, including (but not limited to) flexible-SINC ADC circuit 900, may be modified in a large number of ways.

Several exemplary embodiments may be variations of exemplary circuit 400B of FIG. 4B, which may be characterized as an analog-to-digital (A/D) converter circuit/system or as an A/D signal-processing circuit/system. Circuit 400B receives an analog input signal V(AIN,VSS) and provides a digital output signal via serial interface SDO. Other embodiments may receive (evaluate) an input signal that may be either an analog signal or a digital signal and provide (output) an output signal that may be either an analog signal or a digital signal. There are four permutations: analog-in-analog-out (A/A), analog-in-digital-out (A/D), digital-in-analog-out (D/A), and digital-in-digital-out (D/D). Input/output properties of exemplary embodiments may be either A/A, A/D, D/A, or D/D.

An analog signal may be of a continuous-time nature (a waveform), of a discrete-time nature (a sequence of sampled values), or of a composite nature (e.g., a sequence of pulses characterized by an integral/area or some other property of each pulse). An analog signal may be sampled, evaluated and/or represented with respect to (correspond to) a time base that may be substantially uniform, somewhat uniform, or highly non-uniform. An analog signal may be a characterization of various physical quantities, including (but not limited to) voltage, current, electrical charge, magnetic flux, electrical field, light intensity, color, frequency, phase, temperature, speed, mass, pressure, concentration, density, thickness, transparency, reflection, and/or friction.

A digital signal may be any sequence of codes incorporating any type of encoding. A digital signal may correspond to a time base, which may be substantially uniform, somewhat uniform, or highly non-uniform. A code may be a permutation of any number of symbols. A symbol may have any number of possible symbol values. In a physical system (e.g., a computer) a symbol value may be represented by a physical quantity, including (but not limited to) voltage, current, electrical charge, magnetic flux, electrical field, light intensity, color, frequency, phase, temperature, speed, mass, pressure, concentration, density, thickness, transparency, reflection, and/or friction. A multi-symbol code may be represented and/or communicated in a parallel form (several symbols represented simultaneously by a plurality of physical quantities) or in a serial form (one-or-more symbols represented at a first time instance followed by one-or-more symbols represented at a second time instance). An interface for communicating codes serially may include more than one terminal for communicating more than one symbol at a time.

Serial communication of a sequence of symbols may be provided via a terminal providing galvanic isolation. For example, symbols may be communicated wirelessly over a relatively short or long range. Short-range wireless communication includes magnetic coupling using a transformer (coupled inductance) or otherwise. A transformer may be realized as conductive traces on a printed circuit board (PCB). Short-range wireless communication also includes capacitive coupling, which may be provided from one conductor (transmitting antenna) to another conductor (receiving antenna) on a printed circuit board. Wireless communication also includes optical communication, which may be long-range or short-range. Wireless communication may provide an encoding scheme for identifying boundaries between individual codes.

Figure 11:
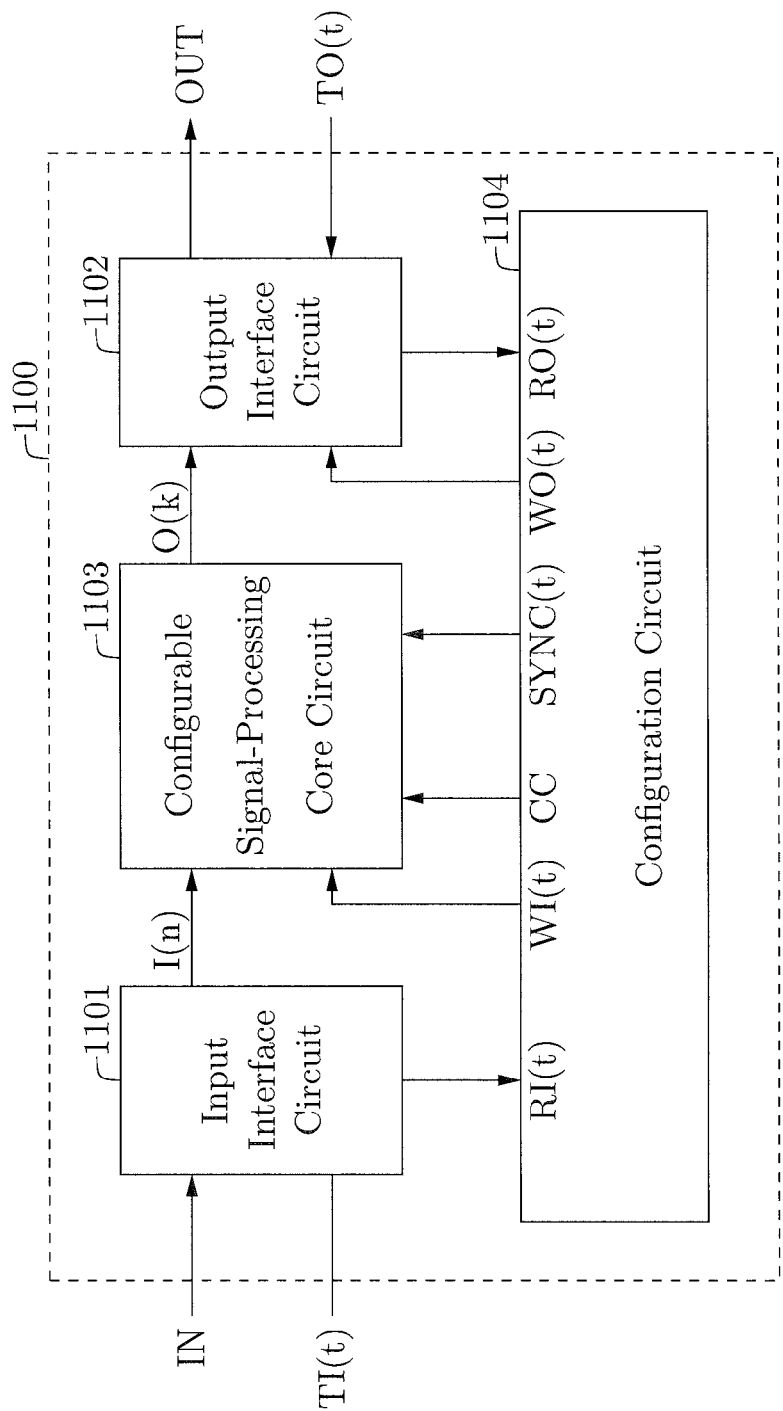
FIG. 11 shows an exemplary configurable signal-processing circuit that receives an input signal IN and outputs an output signal OUT.

FIG. 11 shows an exemplary configurable signal-processing circuit/system 1100. An input interface circuit 1101 receives an input signal IN, which may be an analog signal or a digital signal. Interface circuit 1101 evaluates the input signal IN to derive an input sequence of values I(n). Each value of I(n) may be either an analog value or a code. Accordingly, input IN to output I(n) properties of input interface circuit 1101 may be either A/A, A/D, D/A, or D/D. In the example of FIG. 4A, input interface circuit 401A is a digital-in-digital-out (D/D) circuit. In the example of FIG. 4B, input interface circuit 401B is an analog-in-digital-out (A/D) circuit, commonly referred to as an ADC circuit. An analog sampling circuit may be an example of an analog-in-analog-out (A/A) input interface circuit.

An output interface circuit 1102 provides an output signal OUT, which may be an analog signal or a digital signal. Interface circuit 1102 derives output signal OUT from an output sequence of values O(k). Each value of O(k) may be either an analog value or a code. Accordingly, input O(k) to output OUT properties of output interface circuit 1102 may be either A/A, A/D, D/A, or D/D. In the example of FIG. 4A, output interface circuit 402 is a digital-in-digital-out (D/D) circuit. In another exemplary embodiment, output interface circuit 1102 may be a D/A circuit, commonly referred to as a digital-to-analog converter (DAC) circuit. In some exemplary embodiments, output interface circuit 1102 may comprise a so-called signal-reconstruction circuit (familiar to persons skilled in the art) to derive a continuous-time analog signal waveform OUT from a discrete-time signal. A signal-reconstruction circuit may be an example of an analog-in-analog-out (A/A) output interface circuit.

A configurable signal-processing core circuit 1103 receives input sequence of values I(n) and derives output sequence of values O(k). Input-to-output properties of the signal-processing core circuit 1103 may be either A/A, A/D, D/A, or D/D, corresponding to properties of I(n) and O(k). In one exemplary embodiment, a configurable switched-capacitor circuit may derive an analog output sequence O(k) from an analog input sequence I(n). In another exemplary embodiment, a configurable ADC circuit may derive a digital output sequence O(k) from an analog input sequence I(n). An exemplary delta-sigma ADC circuit may have a configurable sample-rate ratio and/or a configurable frequency response. In another exemplary embodiment, a configurable DAC circuit may derive an analog output sequence O(k) from a digital input sequence I(n). An exemplary delta-sigma DAC circuit may have a configurable sample-rate ratio and/or a configurable frequency response. In another exemplary embodiment, a configurable state machine circuit may derive a digital output sequence O(k) from a digital input sequence I(n). An exemplary state machine circuit may provide a plurality of selectable digital signal-processing operations, including MP3 encoding, decimation filtering, interpolation filtering, and echo cancellation. In the example of FIG. 9, configurable signal-processing core circuit 913 is a state-machine circuit.

A selectable signal-processing operation of the configurable signal-processing core circuit 1103 is selected by a configuration code CC provided by a configuration circuit 1104. Configuration circuit 1104 further provides a timing waveform WI(t) that indicates when values of I(n) are ready to be read/transferred. In some exemplary embodiments, configuration circuit 1104 further provides a timing waveform SYNC(t) for synchronizing a signal-processing operation selected by configuration code CC. A sample-rate ratio for circuit 1103 may be selected by configuration code CC and/or by properties of timing waveforms WI(t) and SYNC(t). In the example of FIG. 7B, timing waveform SYNC(t) synchronizes a selected signal-processing operation. In the example of FIG. 9, RST(t) synchronizes a selected signal-processing operation. Configuration circuit 1104 further provides a timing waveform WO(t) to output interface circuit 1102 that indicates when values of O(k) are ready to be read/transferred. In the example of FIG. 7a, timing waveform WO(t) transfers values of O(k) to output interface circuit 402. In the example of FIG. 9, timing waveform LOAD(t) transfers values of O(k) to output interface circuit 907. Timing waveform LOAD(t) may provide a plurality of pulses for each value of O(k), loading and overwriting a plurality of tentative values for O(k) in circuit 907.

Configuration circuit 1104 provides the configuration code CC and timing waveforms WI(t), WO(t), and SYNC(t) based on a first timing waveform RI(t) received from the input interface circuit 1101 and a second timing waveform RO(t) received from the output interface circuit 1102. In the example of FIG. 9, configuration circuit 704 includes a timing-pattern-to-digital converter (TPDC) circuit 610 that derives a pattern-identification sequence of codes SRC(n) from first timing waveform V(CNV) and second timing waveform V(SCO). A decoder circuit 705 derives configuration code CC and timing waveform SYNC(t) from the pattern-identification sequence of codes SRC(n) and timing waveform V(CNV). A predefined timing pattern may be characterized (defined) by properties of a TPDC circuit and a predefined rule provided by a decoder circuit. Configuration circuit 1104 provides a configuration code CC and timing waveforms WI(t), WO(t), and SYNC(t) that selects a selectable signal-processing operation of circuit 1103 (FIG. 11) in response to if and when timing waveforms RI(t) and RO(t) match a predefined timing pattern.

Input interface circuit 1101 derives the first timing waveform RI(t) based on timing properties for how an external circuit (not shown) provides the input sequence of values I(n) via input interface circuit 1101. In some exemplary embodiments, an external circuit may provide a timing waveform TI(t) that indicates a time base for the input sequence of values I(n). In the example of FIG. 7A, timing waveform V(CNV) indicates a time base for an input sequence of values I(n) that is provided by (via) ADC circuit 401B controlled by V(CNV). In the example of FIG. 4A, configuration circuit 404 may receive either an applied timing waveform V(SCI), or a waveform RI(t) derived from V(SCI), or a timing waveform WI(t) derived from V(SDI) and V(SCI) in combination. Accordingly, in some embodiments, input interface circuit 1101 may receive a timing waveform TI(t).

Other exemplary embodiments of FIG. 11, may provide a timing waveform TI(t) as an output to an external circuit (not shown). In one example, input signal IN may be provided wirelessly by a first external circuit (not shown). A protocol for wireless communication may be used to identify boundaries between codes and/or segments of codes. Input interface circuit 1101 may be a receiver (commonly called a radio), that derives I(n) as well as a time base RI(t) for I(n) from the wireless input signal IN. In this example, input interface circuit 1101 may output a timing waveform TI(t)=RI(t) to a second external circuit to indicate the time base for I(n) derived from input signal IN.

In another example, input interface circuit 1101 may output a timing waveform TI(t) to indicate that a pulse in an anticipated sequence of pulses (e.g. a drop in a stream of fluid) has been detected in an input signal IN. An integral (or another parameter of interest) of the detected pulse may be provided as a value I(n). In this example, TI(t) may be equal to RI(t) and WI(t). Accordingly, in some exemplary embodiments, input interface circuit 1101 may output a timing waveform TI(t) derived from an input signal IN.

An exemplary input interface circuit 1101 may provide operations at a rate that exceeds a sample-to-sample rate of I(n). For example, input interface circuit 1101 may be an over-sampling (delta-sigma) ADC or it may be a digital serial interface circuit. First timing waveform RI(t) may comprise a plurality of transitions (rising and/or falling edges) for each value of I(n). A timing pattern for when transitions of RI(t) occur relative to when transitions of RO(t) occur may match a predefined timing pattern, which may be determined by configuration circuit 1104. First timing waveform RI(t) may have relatively more or fewer transitions than second timing waveform RO(t) for a predefined timing pattern. In the example of FIG. 10, a first timing waveform BUSY(t) has fewer transitions than second timing waveform V(SCO). In the example of FIG. 4A, a first timing waveform V(SCI) may have more transitions than an second timing waveform V(SCO).

Output interface circuit 1102 derives the second timing waveform RO(t) based on timing properties for how an external circuit (not shown) requests values of O(k) to be outputted via output interface circuit 1102. In some embodiments, a value of O(k) may be requested by a single transition or pulse of a timing signal TO(t) applied by the external circuit. For example, output interface circuit 1102 may be a DAC circuit that updates an output signal waveform OUT according to a value of O(k) every time a rising edge is provided in an applied timing waveform TO(t). In this example, output interface circuit 1102 may provide a second timing waveform RO(t)=TO(t) to configuration circuit 1104. Circuit 1101 may be a digital serial interface circuit, and circuit 1103 may provide a selectable interpolation-filter signal-processing operation. This example may be compared to reversing a signal-flow direction (changing inputs to outputs, and vice versa) in the example of FIG. 7A.

In other exemplary embodiments, a value of O(k) may be requested by a plurality of transitions or pulses of TO(t). In the example of FIGS. 5 and 6A, a predefined number N of transitions (rising edges) of V(SCO) may be provided to request a value O(k) to be output via serial interface SDO. Second timing waveform RO(t) may be either V(SCO) or XO(t), depending on whether divide-by-N circuit 601 (FIG. 6) is construed to be a part of configuration circuit 1104 or interface circuit 1102 in FIG. 11.

In the example of FIGS. 7A and 7B, an unknown number of transitions of V(SCO) may be provided to request a value of O(k). Configuration circuit 704 receives a second timing waveform RO(t)=V(SCO) indicating each request for a symbol to be outputted via serial interface SDO. A value of O(k) is requested by V(SCO), because it is represented by a plurality of symbols requested by V(SCO). A timing pattern for requesting symbols to be outputted via serial interface SDO may be provided in accordance with a predefined timing pattern. Configuration circuit 704 provides a TPDC circuit 610 and a decoder circuit 705 to determine if and when symbols are requested in accordance with any one of several predefined timing patterns. Decoder circuit 705 may provide rules to identify how many (which may be an unknown number of) symbols that are requested for each value of O(k). Accordingly, output interface circuit 1102 may provide a second timing waveform RO(t) comprising more than one (including an unknown number of) pulses or transitions for each request for a value of O(k).

First timing waveform TI(t) may be said to be synchronized with receiving, deriving, and/or evaluating values of I(n).

Second timing waveform TO(t) may be said to be synchronized with requesting and/or outputting values of O(k).

In one exemplary embodiment, an input interface circuit may provide a plurality of timing waveforms to a configuration circuit. In the same or another exemplary embodiment, an output interface circuit may provide a plurality of timing waveforms to the configuration circuit. A predefined timing pattern may be defined for any number of timing waveforms, including one, two, three, four, or more.

Exemplary embodiments may include multi-channel signal processing. In the example of FIG. 7A, ADC circuit 401B may be substituted by a multi-channel ADC circuit that has a configuration that receives a plurality of analog input signals. The multi-channel ADC circuit may receive the plurality of analog input signals via a plurality of terminals. For example, 4 analog input signals V(AIN1, VSS), V(AIN2,VSS), V(AIN3,VSS), and V(AIN4,VSS) may be received via 4 terminals AIN1, AIN2, AIN3, and AIN4 provided as a substitute for terminal AIN.

In one example, a multi-channel ADC circuit may comprise an analog multiplexing circuit for sampling a plurality of analog input signals one at a time in a sampling sequence. A sampling sequence may be predefined (fixed) or configurable (selectable).

In another example, a multi-channel ADC circuit may sample a plurality of analog input signals simultaneously responsive to an applied timing waveform V(CNV). An exemplary simultaneous-sampling multi-channel ADC circuit may comprise a plurality of sampling circuits and a single multiplexed core ADC circuit for sequentially evaluating a plurality of simultaneously-sampled values. Another exemplary simultaneous-sampling multi-channel ADC circuit may comprise a plurality of ADC circuits for simultaneously sampling and evaluating a plurality of analog input signal.

A multi-channel ADC circuit may be an input interface circuit 1101 in FIG. 11 that provides a plurality of input sequences, $I1(n)$, $I2(n)$, . . . , instead of a single input sequence $I(n)$. In one example, timing waveform $RO(t)$ may be a single timing waveform synchronized with an operation (e.g., a sampling operation) that is shared by all input sequences $I1(n)$, $I2(n)$, . . . . In another example, $RO(t)$ may be a vector timing waveform comprising a plurality of coordinate timing waveforms. A coordinate timing waveform may be synchronized with an operation for one input sequence. Each input sequence may have a separate sample rate and a separate sequence index, $I1(n1)$, $I2(n2)$, . . . .

Configurable signal-processing core circuit 1103 may provide a plurality of selectable signal-processing operations for each input sequence, $I1(n1)$, $I2(n2)$, . . . to derive a plurality of output sequences $O1(k1)$, $O2(k2)$, . . . . A first signal path and a first signal-processing operation may be defined from $I1(n1)$ to $O1(k1)$. A second signal path and a second signal-processing operation may be defined from $I2(n2)$ to $O2(k2)$. Et cetera. In one example, a configuration code CC may select a signal-processing operation that is shared by all signal paths. In another example, a configuration code CC may separately select a signal-processing operation for each signal path.

In one embodiment, an output interface circuit 1102 may communicate output sequences $O1(k1)$, $O2(k2)$, . . . separately via a plurality of dedicated serial interfaces (terminals SDO1, SDO2, . . . ).

In another embodiment, an output interface circuit 1102 may communicate a plurality of output sequences $O1(k1)$, $O2(k2)$, . . . via a single serial interface. For example, input sequences $I1(n)$, $I2(n)$, . . . may have a common input sample rate. Configurable signal-processing circuit 1103 may provide decimation-filter signal-processing operations that have a separately selectable sample-rate ratio for each signal path. Communication via a serial interface SDO may be based on time-division multiplexing at the input sample rate, which is well-known by persons skilled in the art. For a number P of signal paths, any communication that occur via SDO may be allocated to a particular signal path p in $\{1, 2, \ldots, P\}$ according on an index p of a multiplexed time slot for the communication. Index p for the time slot may be derived by a P-state counting circuit that is incremented at the input sample rate. For example, if a symbol is requested by a low-high-low pulse of timing waveform $TO(t)$ when index p=2, then a symbol of a designated (p=2) output sequence may be output on the serial interface SDO as V(SDO). The low-high-low pulse of $TO(t)$ may be included in a timing waveform provided to a designated (p=2) configuration circuit for deriving a designated configuration code CC2 for a corresponding designated signal path. Exemplary configuration circuit 704 of FIG. 7B may be modified so that TPDC circuit 610 and decoder circuit 705 receive low-high-low pulses only when index p has a designated value, say p=2. Decoder circuit 705 may provide rules that includes selecting a designated signal path for each value of index p. This may be done to synchronize the time-division multiplexing operation with an external circuit without having to allocate any terminals exclusively for that purpose.

Exemplary embodiments may configure any number of features, aspects, and/or parameters for a signal-processing circuit, including (but not limited to) exemplary features, aspects and/or parameters described herein. A configurable signal-processing core circuit may provide a plurality of selectable signal-processing operations, each of which may have a selectable phase property for synchronizing a signal-processing operation. Any auxiliary circuit may have configurable features, including an input interface circuit and an output interface circuit. In one example, an output-current level of a LVDS serial interface circuit may be configurable. In another example, power consumption for an analog-to-digital converter (input interface circuit) may be configurable. In another example, a number of symbols provided in a code for representing a value $O(k)$ may be configurable (useful in combination with chain-type configurations). In another example, a phase property of a serial interface (e.g., code boundaries) may be configurable. In another example, a full-scale signal level (e.g., a reference voltage) for a DAC or ADC circuit may be configurable. In another example, a number of active channels in a multi-channel system may be configurable. In another example, a multiplexing sequence may be configurable for an input interface circuit (e.g., a multiplexing input digital serial interface circuit, or a multi-channel ADC circuit) and/or an output interface circuit (e.g., a multiplexing digital output serial interface circuit, or a multi-channel DAC circuit). In another example, a phase property for a multiplexing operation or circuit may be configurable for synchronization. Persons skilled in the art will recognize that substantially any parameter that can be configured by providing a configuration code via an external connection may be configured according to the present teaching.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A configurable signal-processing circuit that provides a plurality of selectable signal-processing operations, the configurable signal-processing circuit comprising a configuration circuit to detect an externally applied timing pattern for inputting an input signal and outputting an output signal to and from the configurable signal processing-processing circuit, the configuration circuit providing a configuration code responsive to the timing pattern that selects a first signal-processing operation from among the plurality of selectable signal-processing operations.

2. The configurable signal-processing circuit of claim 1 wherein the configuration circuit configures a phase property based on the timing pattern.

3. The configurable signal-processing circuit of claim 1 wherein the configuration circuit comprises a timing-pattern-to-digital converter circuit that provides a pattern-identification sequence of codes in response to the timing pattern.

4. The configurable signal-processing circuit of claim 3 wherein a code in the pattern-identification sequence of codes represents a count of symbols communicated via a serial interface during a period of time.

5. The configurable signal-processing circuit of claim 3 wherein the timing-pattern-to-digital converter circuit includes a state-machine circuit that is responsive to a plurality of timing waveforms.

6. The configurable signal-processing circuit of claim 3 wherein:
the configuration circuit further comprises a decoder circuit that receives the pattern-identification sequence of codes; and
the decoder circuit provides the configuration code in response to a first rule for testing the pattern-identification sequence of codes.

7. The configurable signal-processing circuit of claim 6 wherein the configuration circuit synchronizes the first signal-processing operation based on when the first rule for testing the pattern-identification sequence of codes is fulfilled.

8. The configurable signal-processing circuit of claim 6 wherein the first rule is a branch of a rule for testing the pattern-identification sequence for a plurality of patterns of a variable length.

9. The configurable signal-processing circuit of claim 8 wherein the first rule tests a first code in a first relative position in the pattern-identification sequence of codes with respect to a predefined order of precedence.

10. The configurable signal-processing circuit of claim 8 wherein the first rule tests a first code in a first relative position in the pattern-identification sequence of codes for equality with respect to a predefined code indicating inactivity for a serial interface.

11. The configurable signal-processing circuit of claim 6 wherein the first rule tests a first code in a first relative position in the pattern-identification sequence of codes with respect to a predefined order of precedence.

12. The configurable signal-processing circuit of claim 11 wherein the first rule further tests a second code in a second relative position in the pattern-identification sequence of codes for equality with respect to a predefined code indicating inactivity for a serial interface.

13. The configurable signal-processing circuit of claim 6 wherein the first rule tests for a unique pattern.

14. The configurable signal-processing circuit of claim 1 further comprising an analog-to-digital converter circuit that evaluates the input signal.

15. The configurable signal-processing circuit of claim 14 wherein the output signal is a sequence of multi-symbol codes outputted via a serial interface.

16. The configurable signal-processing circuit of claim 15 wherein the configuration circuit comprises a timing-pattern-to-digital converter circuit that provides a pattern-identification sequence of codes characterizing a number of symbols outputted via the serial interface during a period of time of a duration that is substantially equal to a sample-to-sample period for the analog-to-digital converter circuit.

17. The configurable signal-processing circuit of claim 14 wherein the analog-to-digital converter circuit has a configuration that receives a plurality of analog input signals.

18. The configurable signal-processing circuit of claim 17 wherein a plurality of digital sequences are derived from the plurality of analog input signals and are multiplexed and outputted via a serial interface.

19. The configurable signal-processing circuit of claim 17 wherein the configuration circuit comprises a timing-pattern-to-digital converter circuit and a decoder circuit that provides a configuration code for a selected signal-processing operation for each analog input signal in the plurality of analog input signals.

20. The configurable signal-processing circuit of claim 1 wherein the first signal-processing operation has a substantially flat frequency response in a signal band.

21. The configurable signal-processing circuit of claim 20 wherein an overall frequency response of a second signal-processing operation in the plurality of selectable signal-processing operations has a substantial droop.

22. The configurable signal-processing circuit of claim 1 wherein the output signal is an analog signal.

23. The configurable signal-processing circuit of claim 1 further comprising a digital serial interface circuit that evaluates the input signal.

24. The configurable signal-processing circuit of claim 23 wherein the output signal is a sequence of multi-symbol codes outputted via a serial interface.

25. An analog-to-digital converter circuit that evaluates an analog input signal and outputs an output sequence of encoded numerical values via a serial interface, the analog-to-digital converter circuit comprising a configurable signal-processing core circuit that receives an input sequence of encoded numerical values derived from the analog input signal and derives the output sequence of encoded numerical values, wherein a signal-processing operation provided by the configurable signal-processing core circuit is selectable by requesting symbols to be outputted via the serial interface in accordance with a predefined timing pattern.

26. The analog-to-digital converter circuit of claim 25 wherein a sample-rate ratio for a signal-processing operation provided by the configurable signal-processing core circuit is selectable by requesting symbols to be outputted via the serial interface in accordance with a predefined timing pattern.

27. The analog-to-digital converter circuit of claim 25 wherein a frequency response of a signal-processing operation provided by the configurable signal-processing core circuit is selectable by requesting symbols to be outputted via the serial interface in accordance with a predefined timing pattern.

28. The analog-to-digital converter circuit of claim 25 further comprising a timing-pattern-to-digital converter circuit that receives a first timing waveform and a second timing waveform, wherein:
the first timing waveform is synchronized with the input sequence of encoded numerical values derived from the analog input signal; and
the second timing waveform is synchronized with outputting symbols via the serial interface.

29. The analog-to-digital converter circuit of claim 28 further comprising a decoder circuit that receives a pattern-identification sequence of codes from the timing-pattern-to-digital converter circuit and provides a configuration code for selecting a signal-processing operation of the configurable signal-processing core circuit.

30. The analog-to-digital converter circuit of claim 25 wherein the configurable signal-processing core circuit provides a first predefined signal-processing operation that provides the output sequence of encoded numerical values at a sample rate that is lower than a sample rate of the input sequence of encoded numerical values.

31. The analog-to-digital converter circuit of claim 25 wherein a sample-rate ratio for a first selectable signal-processing operation is greater than a sample-rate ratio for a second selectable signal-processing operation.

32. The analog-to-digital converter circuit of claim 25 wherein the configurable signal-processing core circuit is configurable to provide one of a plurality of predefined decimation-filter signal-processing operations.

33. The analog-to-digital converter circuit of claim 25 wherein a selection of a signal-processing operation provided by the configurable signal-processing core circuit is a function of a sample-rate ratio that is selectable by requesting symbols to be outputted via the serial interface in accordance with a predefined timing pattern.

34. A signal-processing circuit that receives a sequence of input values and outputs a first value in a sequence of output values in response to receiving a request for the first output value, the signal-processing circuit comprising a state-machine circuit that transitions to a predefined state or a state that is equivalent to the predefined state in response to the signal-processing circuit receiving the request for the first output value, wherein a second value in the sequence of output values is responsive to a state of the state-machine circuit.

35. The signal-processing circuit of claim 34 wherein the second value in the sequence of output values is substantially proportional to a weighted sum of a plurality of values comprised in the sequence of input values.

36. The signal-processing circuit of claim 34 wherein the state-machine circuit comprises a circuit that provides an integration operation.

37. The signal-processing circuit of claim 34 wherein the state-machine circuit provides an encoded representation of a sample-rate ratio.

38. The signal-processing circuit of claim 34 wherein the signal-processing circuit includes a circuit that operates as a decimation filter with a selectable sample-rate ratio.

39. The signal-processing circuit of claim 34 further comprising an analog-to-digital converter circuit that provides the sequence of input values.

40. The signal-processing circuit of claim 34 wherein the signal-processing circuit outputs the first value in the sequence of output values via a serial interface while receiving a plurality of input values.

41. The signal-processing circuit of claim 34 wherein the signal-processing circuit provides a signal-processing operation selected from a plurality of selectable signal-processing operations based on a predefined function of a selectable sample-rate ratio.

42. The signal-processing circuit of claim 34 wherein the signal-processing circuit provides a signal-processing operation selected from a plurality of selectable signal-processing operations responsive to a timing pattern for receiving input values and requesting output values.

43. The signal-processing circuit of claim 42 wherein the signal-processing circuit provides a signal-processing operation that is independently configurable for each output value in the sequence of output values.

44. The signal-processing circuit of claim 42 wherein a selectable signal-processing operation is substantially equivalent to that of a first-order SINC decimation filter.

45. The signal-processing circuit of claim 34 wherein the signal-processing circuit provides a multiplexing operation for a plurality of signal paths.

46. A signal-processing circuit comprising a configuration circuit to detect an externally applied timing pattern for inputting an input signal and outputting an output signal to and from the signal processing circuit, the configuration circuit providing a configuration code responsive to the timing pattern that selects a configurable property of the signal-processing circuit.

* * * * *